US011943417B2

United States Patent
Wong et al.

(10) Patent No.: US 11,943,417 B2
(45) Date of Patent: Mar. 26, 2024

(54) THREE-DIMENSIONAL INTEGRAL-IMAGING LIGHT FIELD DISPLAY AND OPTIMIZATION METHOD THEREFOR

(71) Applicant: HUAWEI TECHNOLOGIES CO., LTD., Guangdong (CN)

(72) Inventors: Man Kai Wong, Markham (CA); Mahdi Safari, Toronto (CA); Jingqun Li, Waterloo (CA); Song Zhang, Ottawa (CA)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/864,247

(22) Filed: Jul. 13, 2022

(65) Prior Publication Data

US 2024/0022698 A1 Jan. 18, 2024

(51) Int. Cl.
*H04N 13/125* (2018.01)
*G02B 30/27* (2020.01)
*G06N 3/045* (2023.01)
*H04N 13/111* (2018.01)

(52) U.S. Cl.
CPC ........... *H04N 13/125* (2018.05); *G02B 30/27* (2020.01); *G06N 3/045* (2023.01); *H04N 13/111* (2018.05)

(58) Field of Classification Search
CPC .... H04N 13/125; H04N 13/111; G02B 30/27; G02B 30/00; G06N 3/045
See application file for complete search history.

(56) References Cited

U.S. PATENT DOCUMENTS

| 11,150,605 B1 * | 10/2021 | Xiao | G06N 3/084 |
| 2023/0021926 A1 * | 1/2023 | Zhao | G06N 3/08 |

FOREIGN PATENT DOCUMENTS

WO WO-2022020859 A1 * 1/2022

OTHER PUBLICATIONS

D. Nam, J. Lee, Y. H. Cho, Y. J. Jeong, H. Hwang and D. S. Park, "Flat Panel Light-Field 3-D Display: Concept, Design, Rendering, and Calibration," in Proceedings of the IEEE, vol. 105, No. 5, pp. 876-891, May 2017, doi: 10.1109/JPROC.2017.2686445.
Byoungho Lee, Soon-gi Park, Keehoon Hong, Jisoo Hong, "Design and Implementation of Autostereoscopic Displays," published by SPIE Press, Bellingham, Washington, USA, 2016, https://doi.org/10.1117/3.2190156.
J. Geng, "Three-dimensional display technologies," Adv. Opt. Photonics. 5, 456 (2013).
Z. Fan et al., "3D Quantitative Evaluation System for Autostereoscopic Display," J. Display Technol. 12, No. 10, 1185 (2016).

(Continued)

*Primary Examiner* — Lixi C Simpson
(74) *Attorney, Agent, or Firm* — Locke Lord LLP; Tim Tingkang Xia, Esq.

(57) ABSTRACT

An apparatus has a pixel array, a multi-lens array (MLA) coupled to the pixel array, and circuitry functionally coupled to the pixel array. The pixel array has a plurality of pixels for receiving-and-displaying or sensing-and-outputting a plurality of elemental images. The MLA has a plurality of lenslets. The circuitry has a model for processing the plurality of elemental images. The model and one or more characteristics of the plurality of lenslets are jointly optimized.

9 Claims, 18 Drawing Sheets

(56) References Cited

OTHER PUBLICATIONS

Juejun Hu, "Lecture Notes: Amorphous Materials," Massachusetts Institute of Technology, https://ocw.mit.edu/courses/3-071-amorphous-materials-fall-2015/resources/mit3_071f15_lecture 12/.
"Guide to Spherical Aberration," https://shotkit.com/spherical-aberration/.
"Comparison of Optical Aberrations," https://www.edmundoptics.fr/knowledge-center/application-notes/optics/comparison-of-optical-aberrations/.
C. Kim et al., "Doublet metalens design for high numerical aperture and simultaneous correction of chromatic and monochromatic aberrations," Opt. Express 28, No. 12, 18059 (2020).
H. Huang et al., "Generalized methods and strategies for modeling and optimizing the optics of 3D head-mounted light field displays," Opt. Express 27, No. 18, 25154 (2019).
H. Huang et al., "Systematic characterization and optimization of 3D light field displays," Opt. Express 25, No. 16, 18508 (2017).
R. Martinez-Cuenca et al., "Progresses in 3D imaging and display by integral imaging," Proc. SPIE 7329, 73290P (2009).
E. Tseng et al., "Neural Nano-Optics for High-quality Thin Lens Imaging," Nat. Commun. 12, 6493 (2021).
Biao Yang, Jinyun Zhou, Qiming Chen, Liang Lei, and Kunhua Wen, "Fabrication of hexagonal compound eye microlens array using DMD-based lithography with dose modulation," Opt. Express 26, 28927-28937 (2018).
FOVI3D Presentation: "Light-field Display Technical Deep Dive," retrieved from http://creativity.arch.tamu.edu/_common/FoVI3D_DeepDrive.pdf.
S. Banerji et al., "Super-resolution imaging with an achromatic multi-level diffractive microlens array," Opt. Lett. 45, 6158-6161 (2020).
Z.-B. Fan et al., "A broadband achromatic metalens array for integral imaging in the visible," Light Sci. Appl. 8, 67 (2019).
Z. Huang et al., "Achromatic and wide-field metalens in the visible region," Opt. Express 29, No. 9, 13542 (2021).
S. Colburn et al., "Metasurface optics for full-color computational imaging," Science Advances, vol. 4, No. 2, eaar2114 (2018), doi: 10.1126/sciadv.aar2114, https://www.science.org/doi/abs/10.1126/sciadv.aar2114.
A. Majumdar, "Meta-optical computational imaging systems for large aperture, aberration-free imaging," in OSA Optical Design and Fabrication 2021 (Flat Optics, Freeform, IODC, OFT), F. Capasso, W. Chen, P. Dainese, J. Fan, J. DeGroote Nelson, F. Duerr, J. Rogers, J. Rolland, P. Clark, R. Pfisterer, H. Rehn, S. Thibault, M. Jenkins, D. Wook Kim, and N. Trela-McDonald, eds., OSA Technical Digest (Optica Publishing Group, 2021), paper FW4C.1.
L. Huang et al., "Design and analysis of extended depth of focus metalenses for achromatic computational imaging," Photon. Res. 8, No. 10, 1613 (2020).
M. Martínez-Corral et al., "Fundamentals of 3D imaging and displays: a tutorial on integral imaging, light-field, and plenoptic systems," Advances in Optics and Photonics, vol. 10, issue 3, p. 512, Sep. 2018, doi: 10.1364/AOP.10.000512.
Z. Qin et al., "Image Formation Modeling and Analysis of Near-Eye Light Field Displays," Journal of the Society for Information Display 27(4), Mar. 2019, DOI:10.1002/jsid.771.
Z. Qin et al., "Resolution-enhanced light field displays by recombining subpixels across elemental images," Optics Letters 44(10):2438, May 2019, doi:10.1364/OL.44.002438.

\* cited by examiner

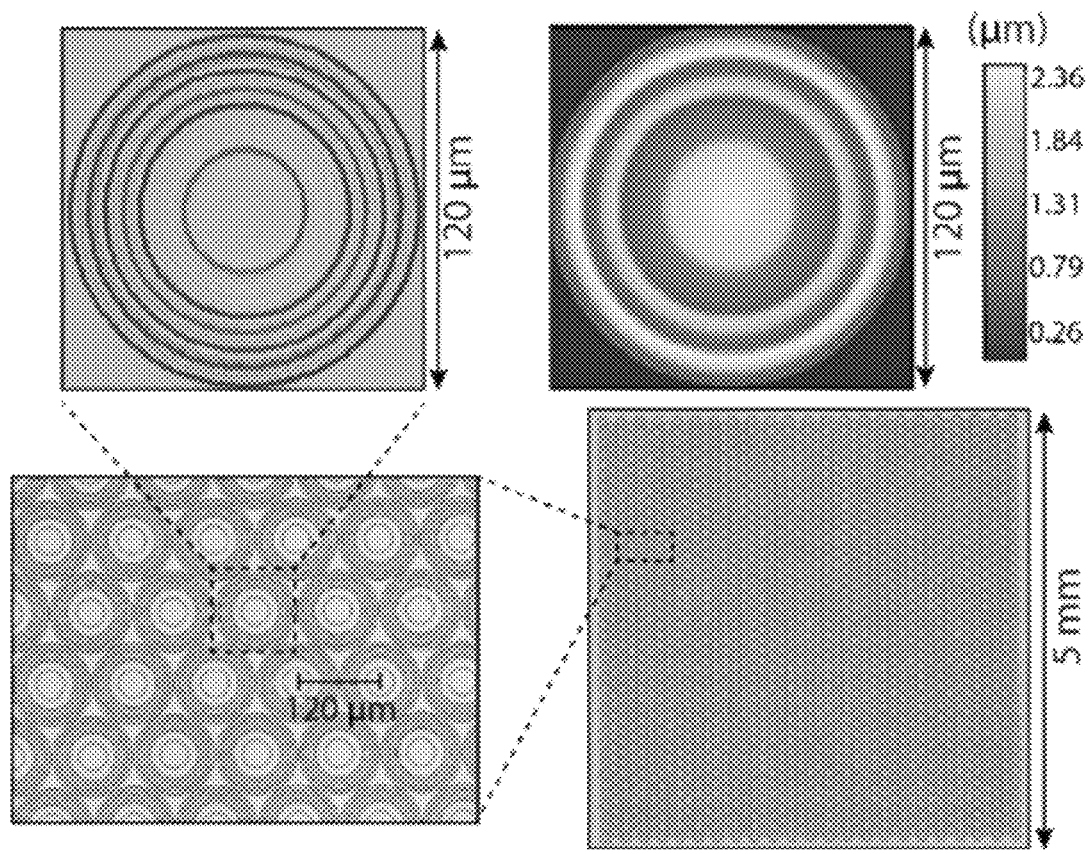
FIG. 15
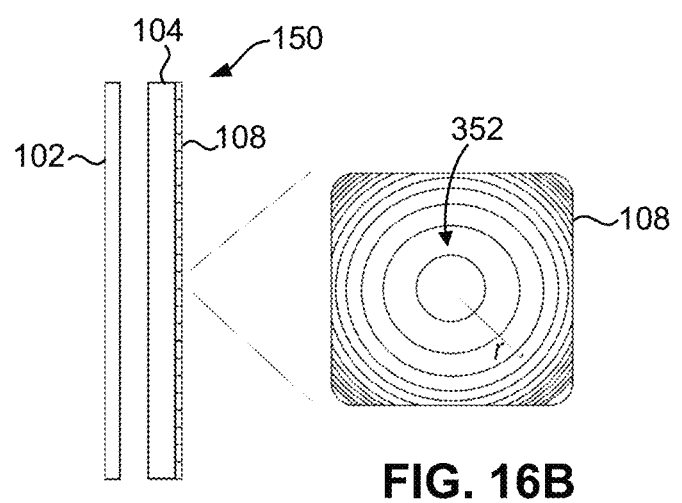
FIG. 16A
FIG. 16B

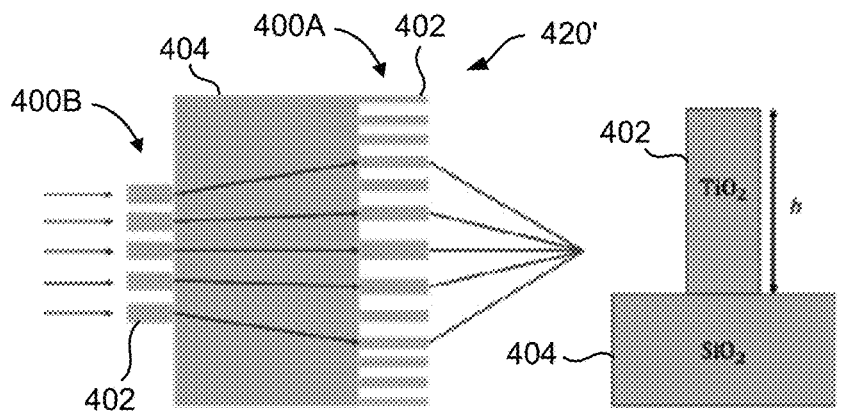 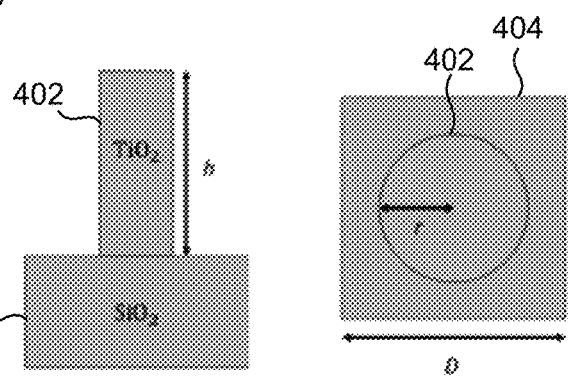
FIG. 19A     FIG. 19B     FIG. 19C
Point spread function (PSF)
Red     Green     Blue
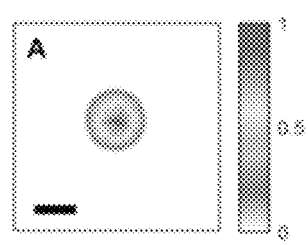 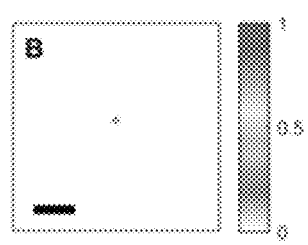 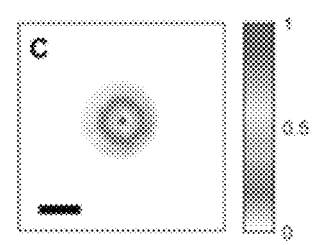
$\alpha = 0$ (metalens)
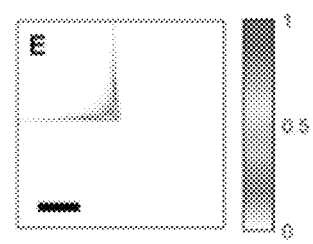 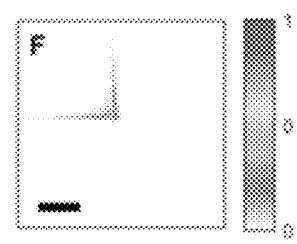 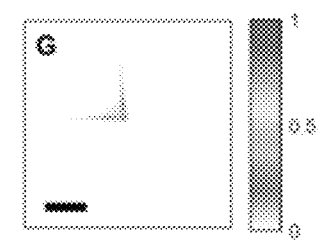
$\alpha = 55\pi$ (cubic metasurface)
FIG. 20A

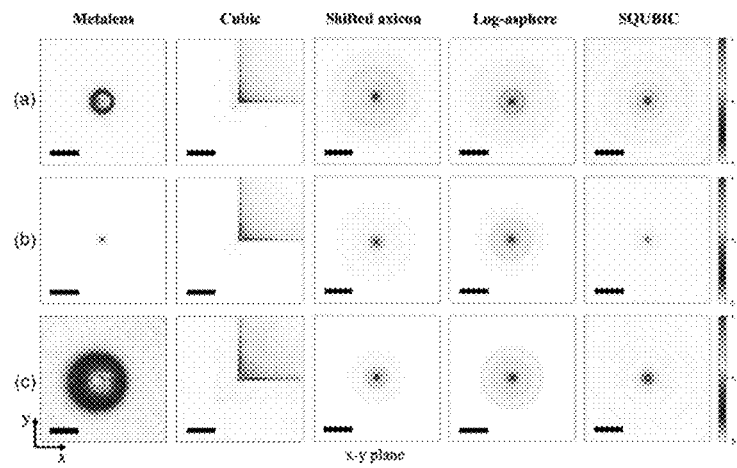
FIG. 22
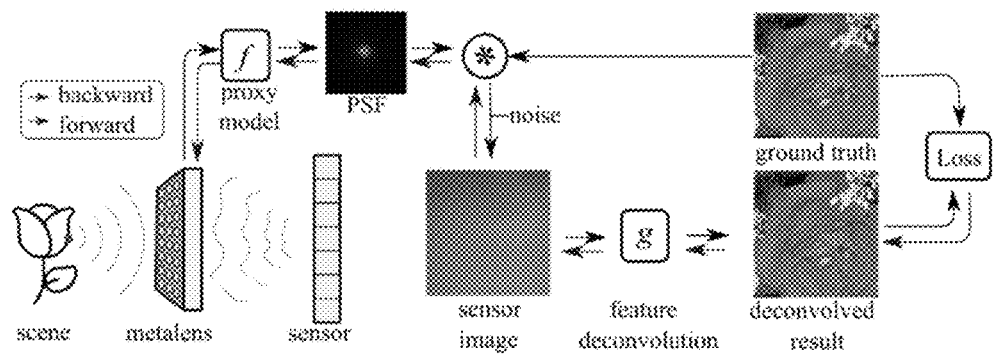
FIG. 23 (Prior Art)
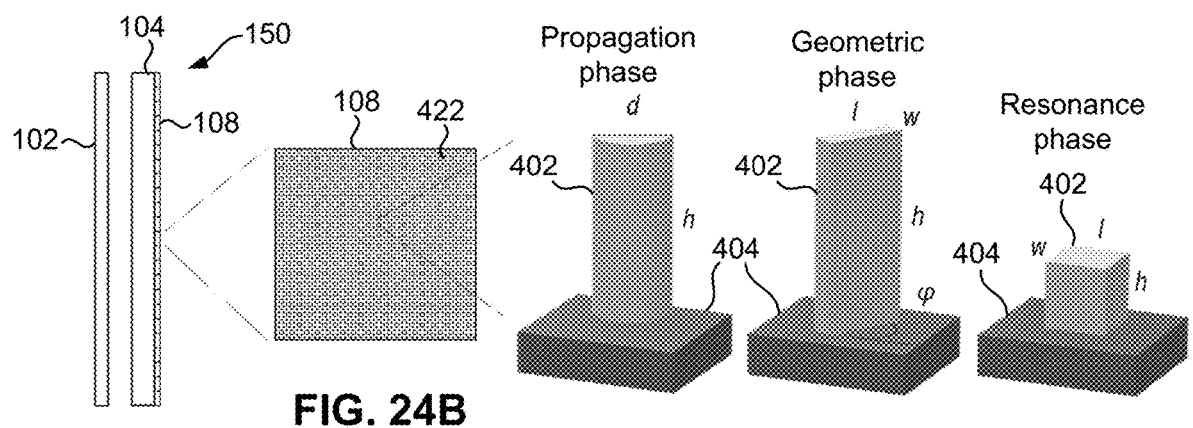
FIG. 24A  FIG. 24B  FIG. 24C  FIG. 24D  FIG. 24E

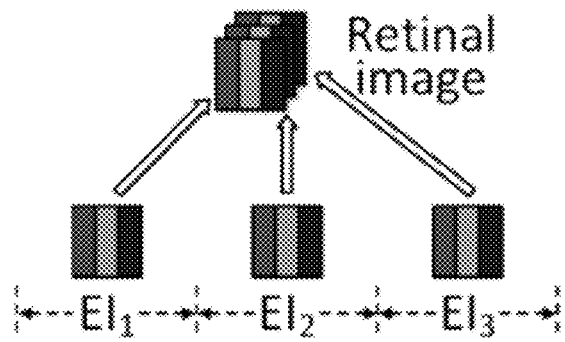 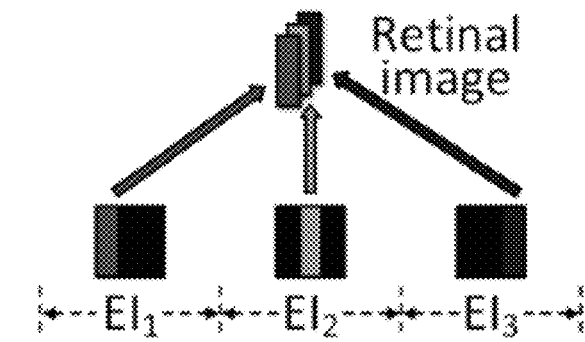
FIG. 27A  FIG. 27B
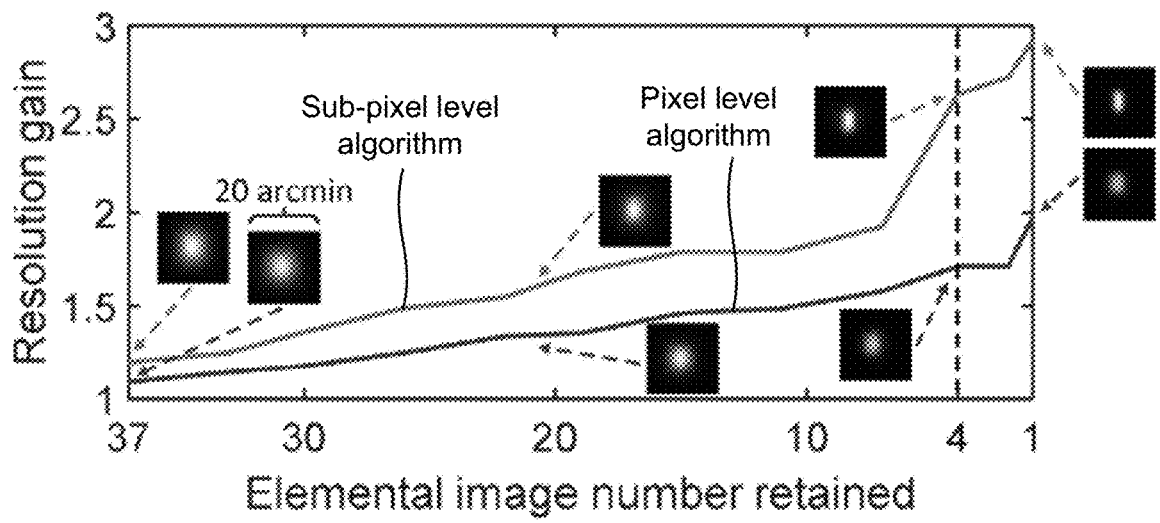
FIG. 27C
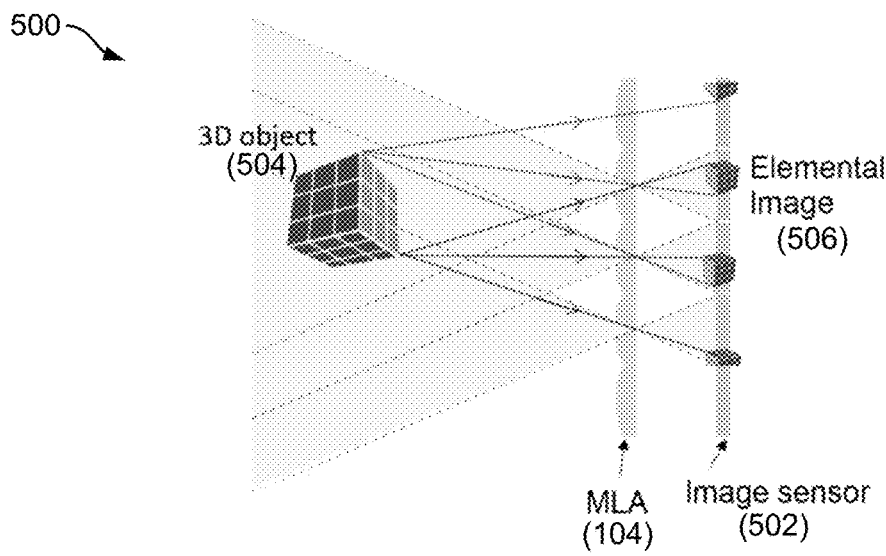
FIG. 28

THREE-DIMENSIONAL INTEGRAL-IMAGING LIGHT FIELD DISPLAY AND OPTIMIZATION METHOD THEREFOR

FIELD OF THE DISCLOSURE

The present disclosure relates generally to three-dimensional (3D) integral-imaging light field display (LFD) and optimization method therefor, and in particular to 3D integral-imaging LFD using a multi-lens array (MLA) and an image-generation model, and optimization method for jointly optimizing the MLA and the image-generation model.

BACKGROUND

For ease of reading, subsection J of the Detailed Description lists the acronyms used in this disclosure. Subsection K lists references cited in this disclosure. The content of each of these references listed in subsection K is incorporated herein by reference in its entirety.

Light-field display (LFD) is a multiscopic and autostereoscopic three-dimensional (3D) display technology. As those skilled in the art understand, multiscopy refers to the 3D display technologies that provide multi-view visual information such as displaying more than two images of various viewing angles towards respective directions to allow a plurality of viewers to simultaneously view 3D images from different viewing angles. Autostereoscopy refers to the 3D display technologies allowing viewers to view 3D images without the requirement of any eyewear (such as headgear, glasses, or the like).

By using a display panel having a pixel array as the image/video light source and a projection optics (such as a parallax barrier, a pinhole array, or a multi-lens array (MLA)) for projecting the different directional views, LFD provides a visual reproduction complete with all significant depth cues including parallax in all directions (that is, perspective that changes with the position and distance of the viewer), and ideally the cue of accommodation (that is, the adjustments of eye focus required to clearly see objects at different distances). Thus, 3D LFD technologies may overcome the problem of vergence-accommodation conflict (VAC) that often causes visual fatigue, eyestrain, and other vision problems to viewers using conventional stereoscopic displays.

SUMMARY

According to one aspect of this disclosure, there is provided an apparatus comprising: a pixel array comprising a plurality of pixels for receiving-and-displaying or sensing-and-outputting a plurality of elemental images; a multi-lens array (MLA) coupled to the pixel array, the MLA comprising a plurality of lenslets; and a circuitry functionally coupled to the pixel array, the circuitry comprising a model for converting a plurality of perspective views to the plurality of elemental images and sending the plurality of elemental images to the pixel array; the model and one or more characteristics of the plurality of lenslets are jointly optimized.

In some embodiments, the plurality of lenslets are refractive lenslets, diffractive lenslets, or metasurface lenslets.

In some embodiments, the model comprises a deconvolution neural network.

In some embodiments, parameters of the deconvolution neural network and the one or more characteristics of the plurality of lenslets are jointly optimized.

In some embodiments, a plurality of weights of the deconvolution neural network and the one or more characteristics of the plurality of lenslets are jointly optimized.

In some embodiments, the model and one or more characteristics of the plurality of lenslets are jointly optimized by using a deconvolution neural network model.

According to one aspect of this disclosure, there is provided a method for training the deconvolution neural network model, the method comprising: converting a set of input perspective images to a set of elemental images; distorting the set of elemental images by using the deconvolution neural network and point spread functions (PSFs) of the MLA at vicinity $\theta+\epsilon$ of a plurality of viewing angles $\theta$, the deconvolution neural network comprising one or more first parameters, and the PSFs being generated based on one or more second parameters of the MLA; adding Gaussian and Poisson display-noise display noise to the set of distorted elemental images to generate synthetic measurement (SM); using a convolution function to convolve the SM with PSFs of the MLA at the plurality of viewing angles $\theta$ to generate a plurality of second perspective images; comparing the input perspective images and the output perspective images to generate a loss; and adjusting the one or more first parameters and the one or more second parameters to minimizing the loss.

In some embodiments, said converting the set of input perspective images to the set of elemental images by using a pixel-mapping algorithm comprises: converting the set of input perspective images to the set of elemental images by using a pixel-mapping algorithm.

According to one aspect of this disclosure, there is provided a method for training the deconvolution neural network model, the method comprising: using a convolution function to convolve a plurality of first perspective images with PSFs of the MLA at vicinity $\theta+\epsilon$ of a plurality of viewing angles $\theta$ to generate a set of elemental images, the PSFs being generated based on one or more first parameters of the MLA; adding Gaussian and Poisson display noise to the set of elemental images to generate SM; distorting the SM by using a deconvolution neural network and PSFs at the plurality of viewing angles $\theta$ to obtain a plurality of distorted perspective images, the deconvolution neural network comprising one or more second parameters; comparing the first perspective images and the second perspective images to generate a loss; and adjusting the one or more first parameters and the one or more second parameters to minimizing the loss.

According to one aspect of this disclosure, there is provided a method for evaluating an apparatus comprising: inputting a plurality of first perspective images to a circuitry of the apparatus for converting the first perspective images to a plurality of elemental images; displaying the plurality of elemental images through a MLA of the apparatus; capturing a plurality of second perspective images displayed through the MLA of the apparatus along a plurality of viewing angles; and comparing the first perspective images and the second perspective images for evaluating the apparatus.

BRIEF DESCRIPTION OF THE DRAWINGS

For a more complete understanding of the disclosure, reference is made to the following description and accompanying drawings, in which:

FIGS. 4A to 4C are schematic diagrams showing the path of light rays passing through a lens with chromatic aberration and monochromatic aberrations, wherein FIG. 4A shows the effect of chromatic aberration, FIG. 4B shows the effect of spherical aberration, and FIG. 4C shows the effect of coma aberration;

FIG. 15 show microscope images of a multi-level diffractive MLA used for super-resolution imaging;

FIG. 16A is schematic side view of an integral-imaging LFD shown in FIG. 10 using a plurality of diffractive lenslets as the MLA;

FIG. 16B is a schematic plan view of a diffractive lenslet shown in FIG. 16A;

FIG. 19A is a schematic cross-sectional view of another exemplary optical devices having two metasurface layers coated on opposite surfaces of a substrate for correcting chromatic and achromatic aberrations;

FIG. 19B and 19C are schematic side view and plan view of a nanofin of the metasurface layers shown in FIG. 18A;

FIGS. 20A and 20B show the point spread functions (PSFs) and imaging results, respectively, of a standard metalens and a metalens augmented with an auxiliary cubic phase mask for extended DoF imaging;

FIG. 22 shows the measured PSFs of the standard metalens and ones augmented by auxiliary phase masks at wavelengths of (a) 455 nm (blue), (b) 530 nm (green), and (c) 625 nm (red);

FIG. 23 shows a prior-art end-to-end imaging pipeline that consists of a metasurface image-formation model and a feature-based deconvolution model;

FIG. 24A is a schematic side view of the integral-imaging LFD shown in FIG. 10 using metasurface lenslets as the MLA;

FIG. 24B is a schematic plan view of a metasurface lenslet shown in FIG. 24A;

FIGS. 24C to 24E are schematic perspective views of various types of a nanofin of the metasurface lenslet shown in FIG. 24A, including propagation, geometric, and resonance phase types;

FIGS. 27A and 27B show retinal light field images integrated from elemental images $EI_1$, $EI_2$, and $EI_3$ using triad pixels and using subpixels, respectively;

FIG. 27C shows the resolution gain as a function of the elemental image number retained for both the pixel-level and subpixel-level algorithms;

FIG. 28 is a schematic diagram showing a 3D integral-imaging light-field camera having a MLA and an image post-processing model, according to some embodiments of this disclosure.

DETAILED DESCRIPTION

A. Optics of Three-Dimensional (3D) Integral-Imaging Light Field Display

Figure 1A:
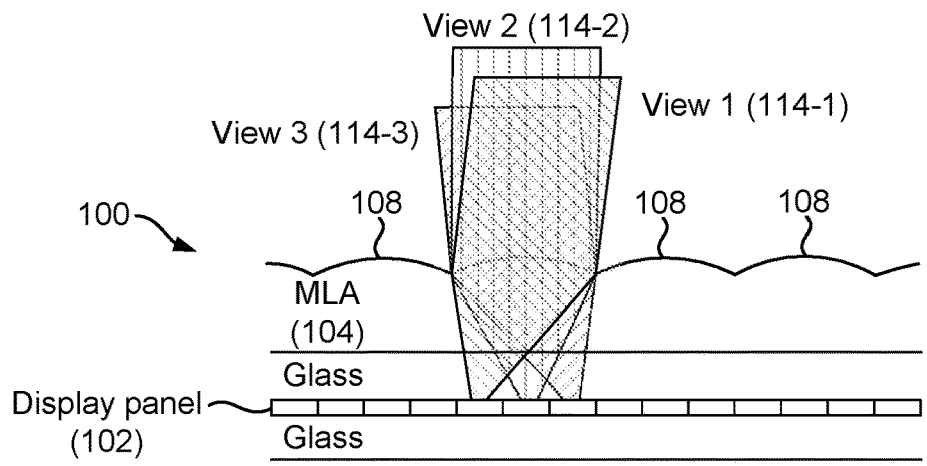
FIGS. 1A and 1B are schematic diagrams showing the optics of an integral-imaging light field display (LFD) having a pixel array and a multi-lens array (MLA) for projecting multiple views.
Figure 1B:
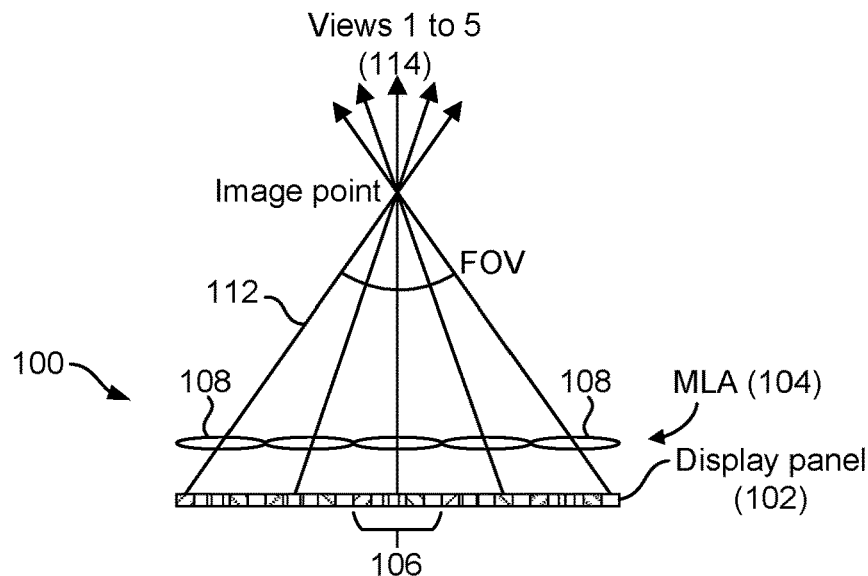

Integral imaging is a multiscopic and autostereoscopic 3D imaging technology for capturing and constructing a light field by using an array of carefully designed lenses, also called a multi-lens array (MLA). FIG. 1A (see Reference [1]) and FIG. 1B are schematic diagrams showing an integral-imaging light-field display (LFD) 100 for providing multiscopic and autostereoscopic three-dimensional images. As shown, the integral-imaging LFD 100 generally comprises a pixel array 102 (also denoted a "display panel") and a multi-lens array (MLA) 104. The pixel array 102 comprises a plurality of pixel groups 106. Each pixel group 106 comprises a plurality of pixels(each pixel may comprise a plurality of lighting components such as three lighting components for red, blue, and yellow lights) for emitting lights 112 to represent an elemental image (EI). As will be described below, the MLA 104 converts the EIs to perspective images (PIs) for viewers to observe.

The MLA 104 comprises a plurality of small-size lenses 108 (denoted "microlenses" or "lenslets" hereinafter) for directing lights 106 emitted from the pixel array 102 towards various directions to form different directional views 114. More specifically, each EI displayed by the pixel array 102 is projected by a corresponding lenslet of the MLA 104 where each pixel of the EI is projected to a different direction. A collection of one pixel from each EI (from the same relative location within the EI) forms a corresponding PI on a target plane (such as the retina of a viewer). However, due to the mismatch between the characteristics of the EIs and those of the MLA 104 and/or due to the imperfection of the MLA 104, the projected PIs may not be the same as the ideal PIs when there is no such characteristics mismatch and/or MLA imperfection (that is, the projected PIs may be distorted from the ideal PIs).

The advantages of the integral-imaging light-field display (LFD) 100 using MLAs 104 include both horizontal and vertical parallaxes, simple and straightforward design, and symmetric configuration in both 3D capture and 3D display (see Reference [3]). The main disadvantage of the integral-imaging light-field display (LFD) 100 using MLAs 104 is the reduced spatial resolution for each view by the number of views.

Figure 2A:
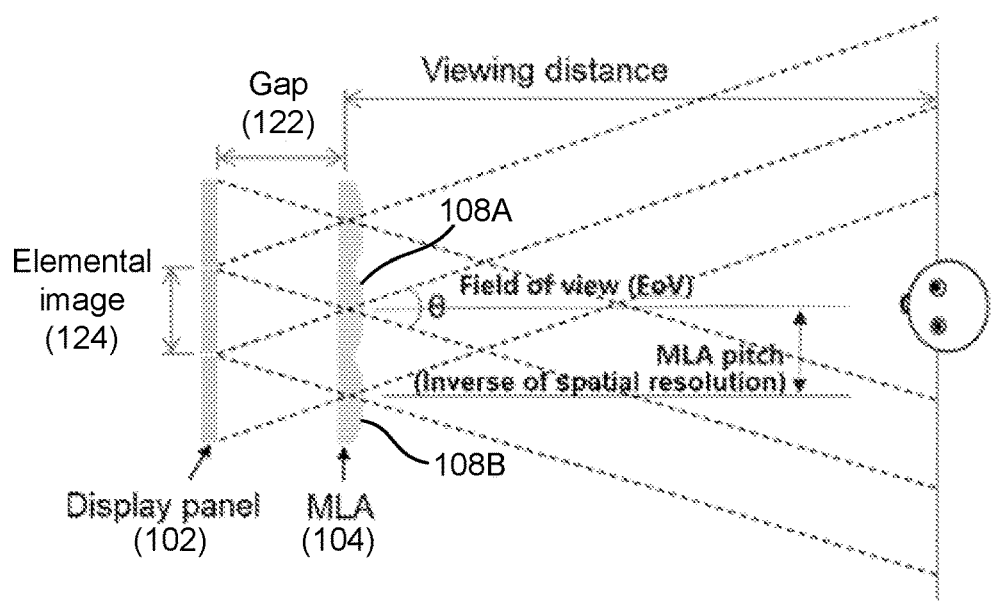
FIGS. 2A to 2C illustrate the key performance metrics of the integral-imaging LFD shown in FIG. 1A.
Figure 2B:
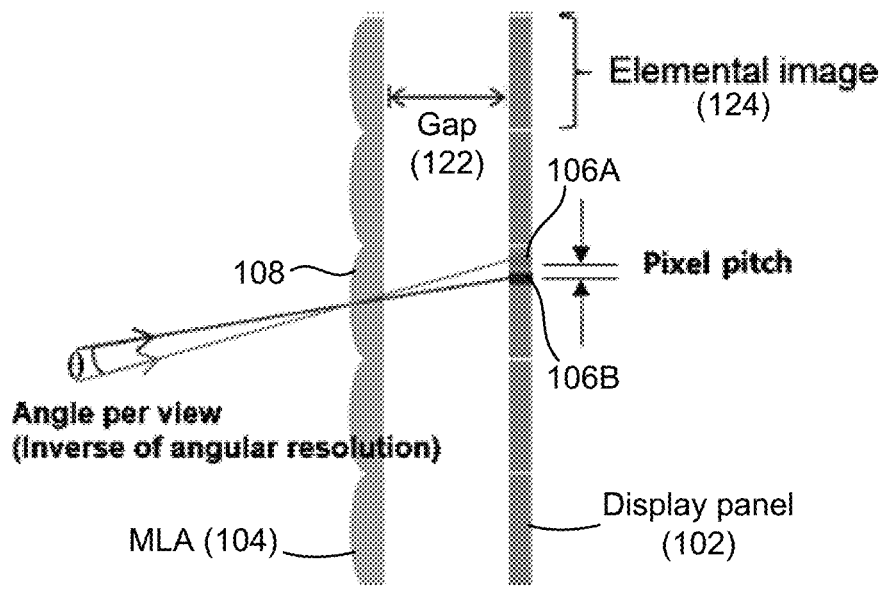
Figure 2C:
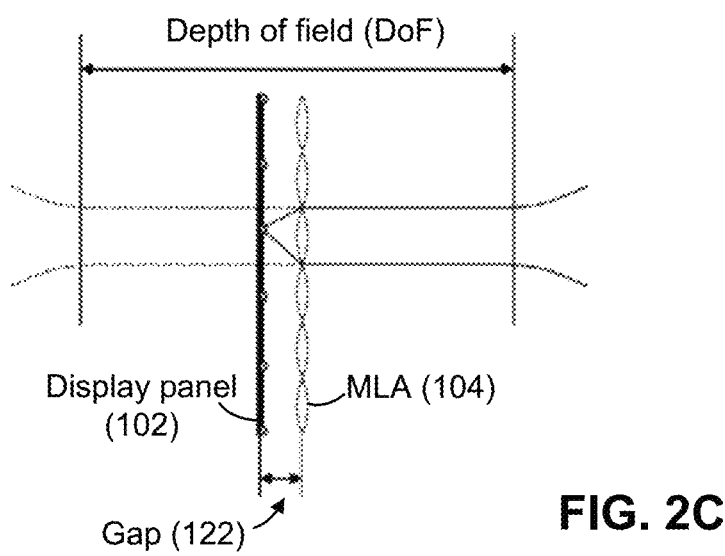

As shown in FIGS. 2A to 2C (see Chapter 3 of Reference [2]), the integral-imaging LFD 100 may be characterized by a plurality of important performance metrics determined by the physical properties of the pixel array 102 and MLA 104, and the gap 122 (also called "air gap") therebetween. These performance metrics includes (see Reference [3]):

- spatial resolution: which is the inverse of the MLA pitch (that is, the distance of two adjacent lenslets 108A and 108B measured from the centers thereof);
- angular resolution: which is the inverse of the angle per view (that is, the viewing angle of two adjacent pixels 106A and 106B viewed through a lenslet 108), which is determined by the gap 122 and the pixel pitch (that is, the distance of the two adjacent pixels 106A and 106B measured from the centers thereof);
- field of view (FoV): the viewable angle of each EI 124;
- depth of field (DoF): the area wherein the image projected onto a target plane therewith has an acceptable sharpness.

Within the constraints of the performance metrics, there are other display-quality metrics that are dependent on the engineering details of the display panel 102 and MLA 104 which include but are not limited to: modulation transfer function (MTF), 2D correlation coefficient, luminance uniformity, peak signal-to-noise ratio (P SNR), color gamut, accuracy of image depth, depth resolution, and the like (see Reference [4]) Given the large number of metrics, it is rather challenging to design the integral-imaging LFD 100 that optimizes the display performance and viewing experience.

A good viewing experience of the integral-imaging LFD 100 may be characterized by high image quality across the entire color spectrum (that is, within the visible wavelength range) and at all viewing angles within the full FoV. Given the superb color image quality provided by modern display panels 102 such as liquid crystal display (LCD) and organic light emitting diode (OLED) display, the performance of the integral-imaging LFD 100 may be optimized by carefully engineering the MLA 104.

Figure 3:
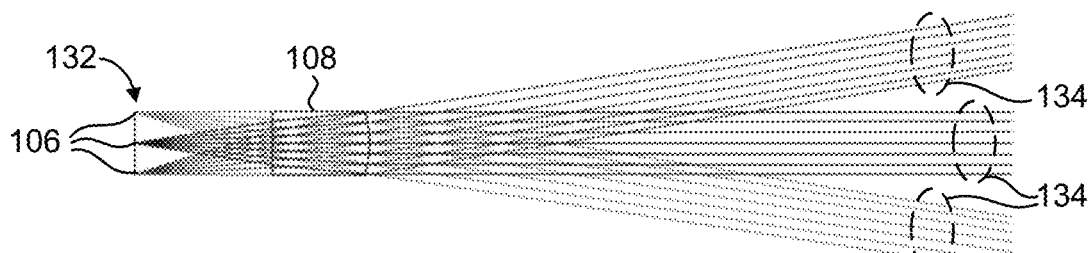
FIG. 3 is a schematic diagram showing a lenslet of the MLA for projecting quasi point sources of the pixel array of the integral-imaging LFD shown in FIG. 1A positioned on the focal plane into collimated beams.
Figure 4A:
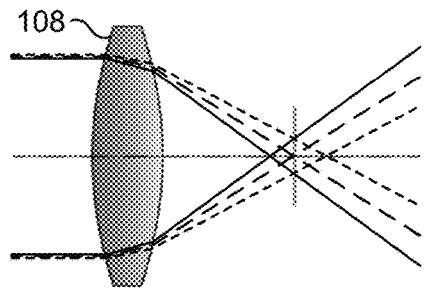
Figure 4B:
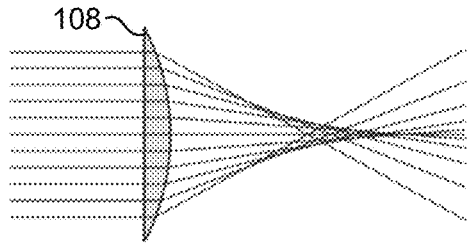
Figure 4C:
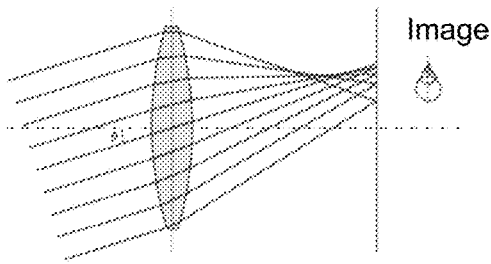

As shown in FIG. 3, each lenslet 108 of the MLA 104 ideally projects light from quasi point sources (that is, the pixels 106 of the pixel array 102) that positioned on the focal plane 132 of the lenslet 108 into collimated beams 134 (that is, parallel rays) for providing different directional views. However, lenses 108 inherently exhibit optical aberrations which cause light to spread out over some region of space rather than focused to a point. As those skilled in the art understand, the optical aberrations may be categorized into chromatic aberration (that is, color-dependent aberration) and monochromatic (that is, the aberration dependent upon ray-incident location or ray-incident angle, such as spherical aberration and coma aberration). For example, FIG. 4A shows the effect of chromatic aberration (see Reference [5]) wherein different line styles represent different light colors, FIG. 4B shows the effect of spherical aberration (see Reference [6]), and FIG. 4C shows the effect of coma aberration (see Reference [7]). Careful engineering of each lenslet 108 of the MLA 104 may minimize these aberrations and optimize the image quality and viewing experience of the integral-imaging LFD 100 (see References [8] and [9]).

Researchers have focused on the theoretical analysis and improvement of the performance of the integral-imaging LFD 100 in recent years, such as the resolution limitation, the maximum viewing angle without flipping, and depth range. Different optical apparatus setups and 3D image rendering algorithms result in varied display quality. Various components, such as curved lens array, dynamic barriers, and adaptive liquid crystal prism arrays, and the like, have also been proposed to improve the viewing zones. At the same time, the methods of objective and systematic evaluation for display quality of the integral-imaging LFD 100 are developed (see Reference [4]), which are useful because the actual quality of the displayed image may deviate from the theoretical results due to fabrication imperfections. However, such evaluation methods still need improvements.

Despite the developments of the integral-imaging LFD, most prior art does not address the holistic optimization of the integral-imaging LFD performance in terms of image quality, and there needs a systematic method of designing the optics hardware and the image generation algorithm to optimize the display quality and viewing experience.

Figure 5:
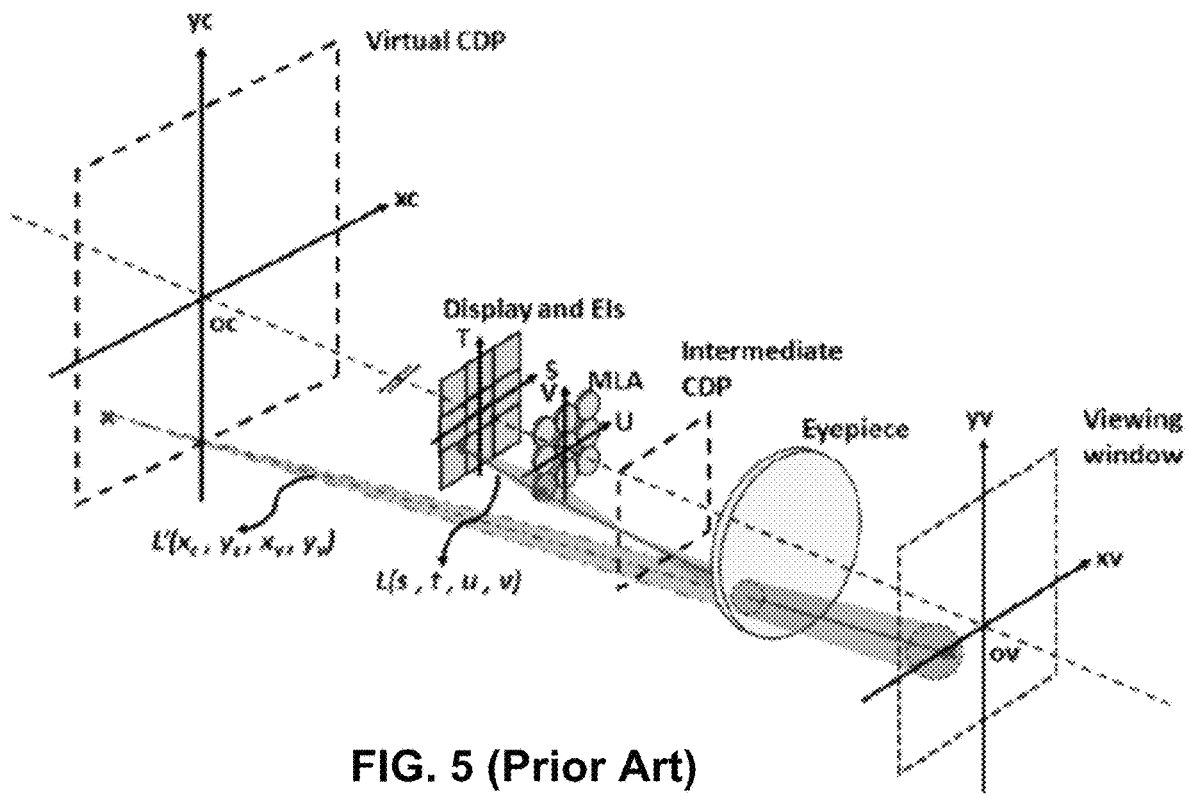
FIG. 5 is a schematic diagram showing a prior-art mapping of the light field function from object to image space for optimizing the projection optics of the integral-imaging LFD shown in FIG. 1A.

Previous work have developed a generalized method for modeling and optimizing the optics of the integral-imaging LFD 100 by ensuring that the 3D light fields physically rendered by the display panel 102 and the MLA 104 in the object space of the integral-imaging LFD 100 is mapped as accurately as possible into the light fields viewed by the eye in the visual space. For example, FIG. 5 is a schematic diagram showing a prior-art mapping of the light field function from object to image space for optimizing the projection optics of the integral-imaging LFD 100 (see References [10] and [11]). However, the disadvantages are that the displayed image content is not considered in the optimization process. Rather, only a few simple metrics that do not directly correspond to good viewing experience are optimized. Moreover, a commercial lens design software is required to generate the metrics and perform the optimization task.

The vertical and horizontal parallaxes of the integral-imaging LFD 100 uses the MLA 104 are inherently limited by the resolution of the two-dimensional (2D) pixel array 102 and the MLA 104 itself. Such limitations lead to tradeoffs between the performance metrics of spatial resolution, angular resolution, FoV, and DoF. While having been one of the main research and development goals of the flat-panel display industry, the optimal tradeoff between the performance metrics that maximizes the 3D image quality and viewing experience has not been devised.

There are other issues with the viewed image quality of the integral-imaging LFD 100 in prior art. FIGS. 6A to 9 show some of these issues (see Reference [12]).

Figure 6A:
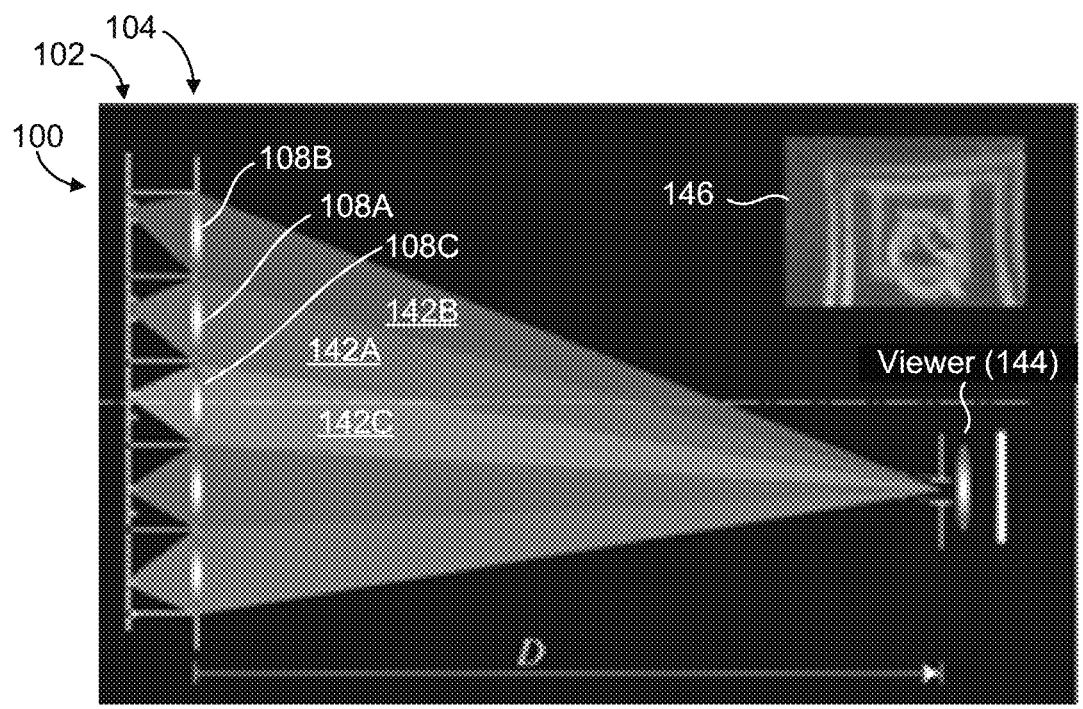
FIGS. 6A and 6B are schematic diagrams illustrating the issue of faceting effect of the integral-imaging LFD shown in FIG. 1A.

FIG. 6A shows an integral-imaging LFD 100 having a MLA 104 with a filling factor of one (1). In other words, there are no gaps between the light beams projected from adjacent lenslets of the MLA 104 (such as the light beams 142A, 142B, and 142C projected from the lenslets 108A, 108B, and 108C, respectively), so that the collection of light beams fully occupy or otherwise fill the space of the overall light field. A viewer 144 then observes a correctly constructed 3D image (FIG. 6A shows a specific PI 146 of the 3D image).

Figure 6B:
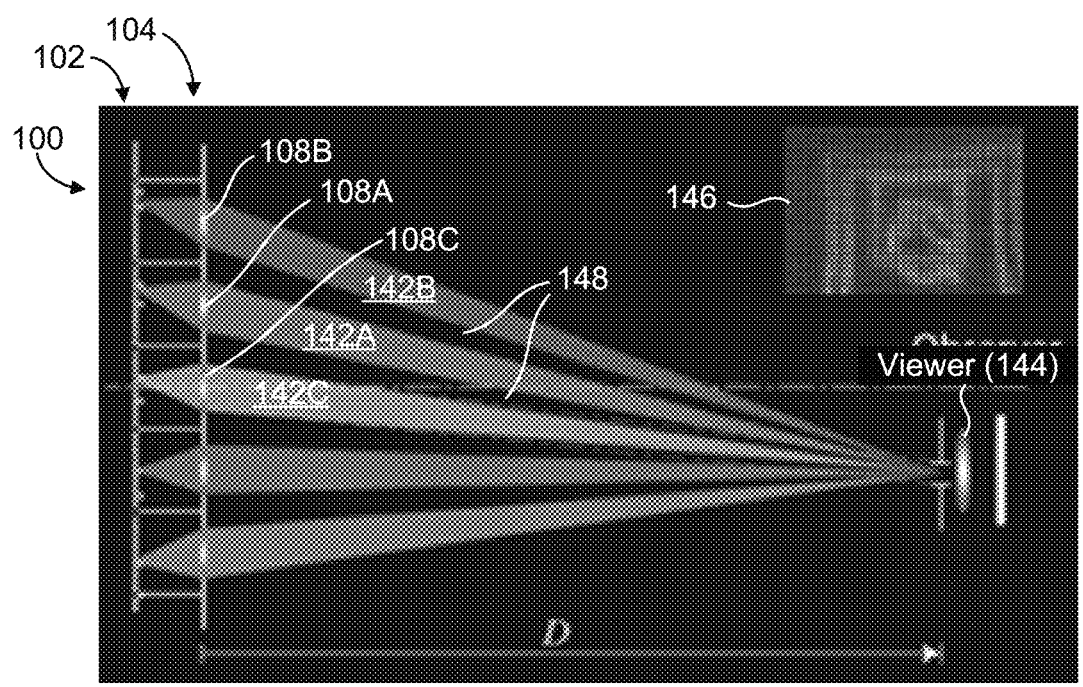

However, in the integral-imaging LFD 100 shown in FIG. 6B, the MLA 104 has a filling factor less than one (1). In other words, there are gaps 148 between the light beams projected from adjacent lenslets of the MLA 104 (such as the light beams 142A, 142B, and 142C projected from the lenslets 108A, 108B, and 108C, respectively), so that the collection of light beams do not fully fill the space of the overall light field. A viewer 144 then observes a vignetting effect of 3D image (FIG. 6B shows a specific PI 146 of the 3D image for illustrating the vignetting effect). Such an issue is denoted the faceting effect.

Figure 7:
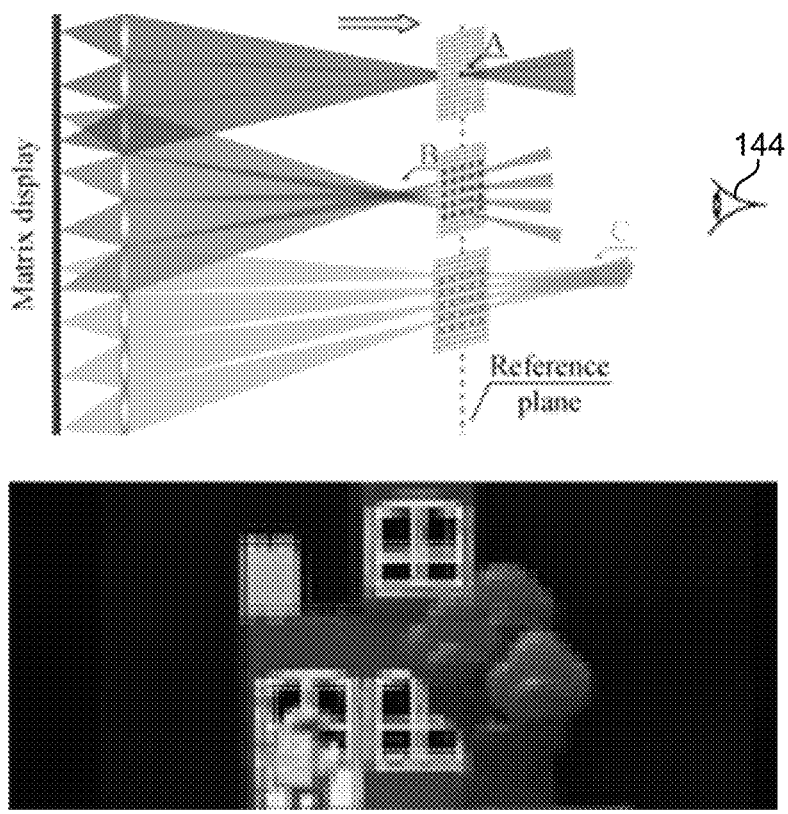
FIG. 7 is a schematic diagram illustrating the issue of facet braiding of the integral-imaging LFD shown in FIG. 1A.
Figure 8:
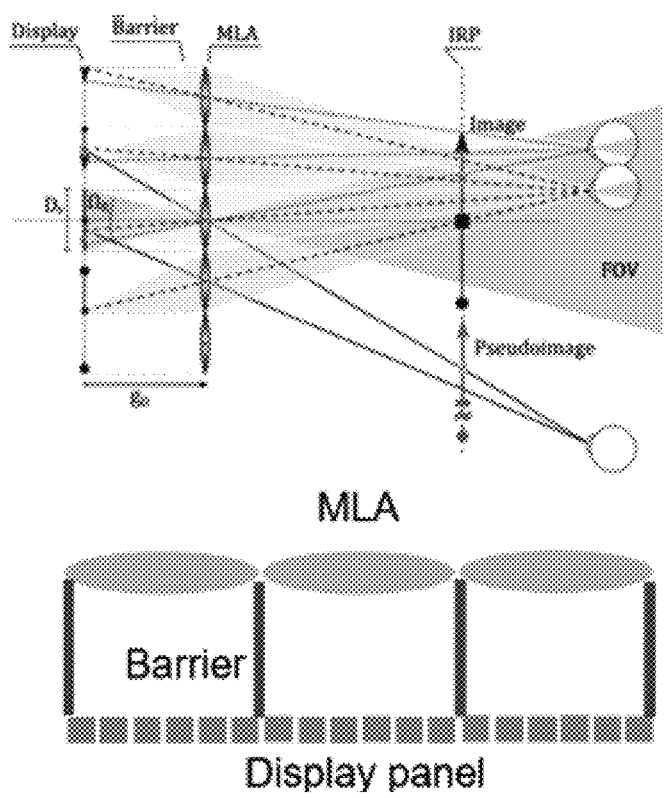
FIG. 8 is a schematic diagram illustrating the issue of overlapping between elemental images of the integral-imaging LFD shown in FIG. 1A.
Figure 9:
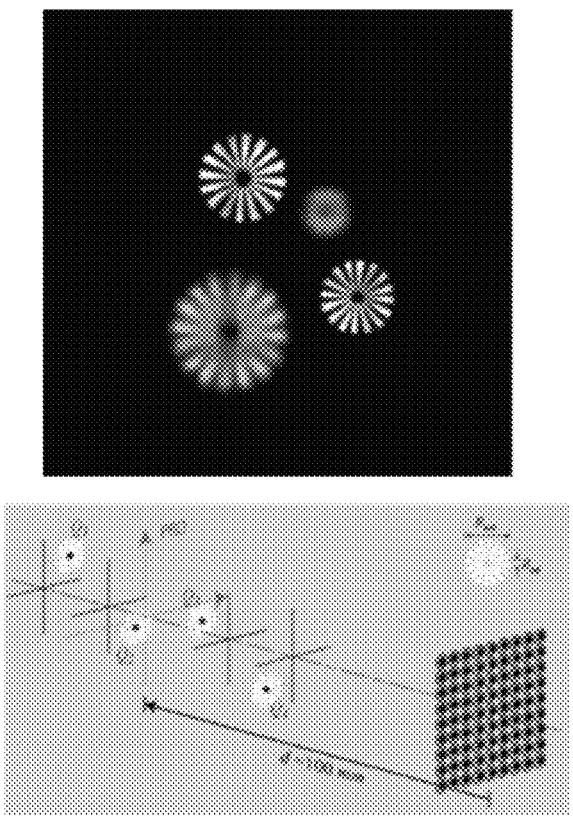
FIG. 9 is a schematic diagram illustrating the issue of deterioration of lateral resolution of out-of-focus objects of the integral-imaging LFD shown in FIG. 1A.

FIG. 7 shows an example of facet braiding caused by limited DoF wherein the viewer 144 observes a matrix of bright dots at the out-of-focus planes. FIG. 8 shows an example of overlapping between EIs when viewing at large angles, which causes crosstalk between adjacent views. FIG. 9 shows an example of fast deterioration of lateral resolution for out-of-focus objects mainly determined by sensor constraints (capture stage) and diffraction effects. Prior-art methods have tackled a subset of these issues in 3D LFDs, but no existing design and optimization method has attempted to simultaneously minimize all of these displayed image quality issues.

B. 3D Integral-Imaging LFD and its Optimization

Figure 10:
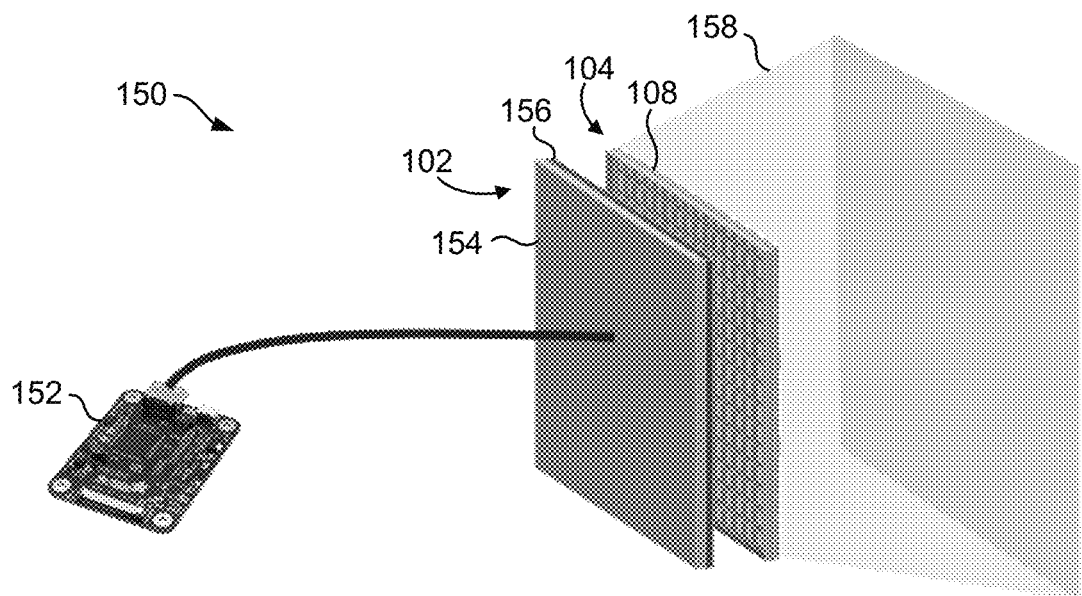
FIG. 10 a schematic diagram showing an integral-imaging LFD for projecting multiple views, according to some embodiments of this disclosure, the integral-imaging LFD comprising a circuitry having an image-generation model, a pixel array, and a MLA.

FIG. 10 is a schematic diagram showing a 3D integral-imaging LFD 150 according to some embodiments of this disclosure, for displaying 3D images to one or more viewers at a distance thereto. In various embodiments, the integral-imaging LFD 150 may be used as any suitable display device such as smartphone display, desktop monitor, television, or the like.

As shown, the integral-imaging LFD 150 comprises a circuitry 152 functionally coupled to a display panel 102 having a transistor backplane layer 152 (such as thin-film transistor (TFT), complementary metal-oxide semiconductor (CMOS), or the like) and a pixel-array layer 154 such as LCD). A MLA 104 is coupled to the front side of the display panel 102 in a manner as described above.

The circuitry 152 comprises necessary electrical and/or optical components (such as a processor, a memory, an input/output interface, and the like) for receiving or generating multi-view images (MVIs) of a 3D scene, and processing the MVIs for outputting to the display panel 102. Herein, each MVI to be processed (denoted "input MVI" hereinafter to differentiate it from the "output MVI" obtained during the training process (described later)) comprises a plurality of ideal PIs (that is, the images that a viewer may see in ideal cases) of the 3D scene from respective viewing angles. For example, in some embodiments, the ideal PIs are tiled to form the input MVI.

When processing the MVIs, the circuitry 152 executes an EI-generation method for converting the MVIs (or more specifically, the PIs thereof) to EIs using an image-generation model, and outputting the EIs to the display panel 102. In some embodiments, the EI-generation method may be implemented as hardware. In some other embodiments, the EI-generation method may be implemented as software or firmware in the form of computer-executable code stored in the memory of the circuitry 152 and executable by the processor of the circuitry 152.

More specifically, the EI-generation method converts the PIs of each MVI to a plurality of EIs (denoted an elemental image array (EIA)). Then, the EI-generation method uses the image-generation model to pre-distort the EIA (that is the EIs) for adapting to the characteristics of the MLA 104 to improve the quality of the PIs projected from the MLA 104 and observed by the viewers. In some embodiments, the image-generation model comprises a deconvolution neural network for pre-distorting the ideal PIs, which in some embodiments is a convolutional neural network (CNN) for image deconvolution, the parameters of which are optimized through a training process (described in more detail later).

The EIs generated by the circuitry 152 is output to the display panel 102 for display. The MLA 104 projects the lights of the EIs towards respective directions to form a light field 158 such that viewers may observe 3D images from various viewing angles.

As described above, the PIs observed by users through the MLA 104 are usually of lower quality than the ideal PIs. In some embodiments, the parameters of the MLA 104 and the image-generation model are jointly optimized for improving the quality (such as the perceptual quality) of the PIs. After optimization, the image-generation model uses the optimized parameters to generate EIs that best match the characteristics of the MLA 104, and the MLA 104 may be fabricated using the optimized parameters thereof to best match the EIs generated using the image-generation model.

In these embodiments, the parameters of the MLA 104 and the image-generation model are jointly optimized using a trained AI model such as a trained neural network model.

In some embodiments, an end-to-end design framework is used for training the AI model based on a plurality of MVIs. The end-to-end design framework is inspired by the design pipeline disclosed in Reference [13] for imaging, with unique features for application to 3D displays such as the integral-imaging LFD 150. The end-to-end design framework disclosed herein intrinsically optimizes the range of the performance metrics that characterize viewing experience, thereby giving rise to improved integral-imaging LFD 150.

The main technical problem solved by the end-to-end design framework disclosed herein is the inability of prior-art design and optimization techniques for the integral-imaging LFD 150 to holistically optimize a range of performance metrics that together characterize the image quality and viewing experience.

The end-to-end design framework disclosed herein provides a design methodology for the integral-imaging LFDs 150 using MLAs 104 that takes into account the displayed image content and holistically optimizes a range of performance metrics that together characterize the image quality and viewing experience. In particular, the design methodology disclosed herein may provide optimized tradeoff between the performance metrics of spatial resolution, angular resolution, FoV, and DoF, and also intrinsically minimizes other problems of the viewed 3D images (such as faceting effect, facet braiding, overlapping of elemental images, and deterioration of lateral resolution of out-of-focus objects), thereby giving rise to improved 3D image quality.

The end-to-end design framework disclosed herein uses an end-to-end neural network that jointly optimizes the parameters of the projection optics (that is, the MLA 104) and the image generation (pre-distortion) algorithm to enhance the display quality and viewing experience of the integral-imaging LFD 150. The parameters are optimized by minimizing the perceptual loss of the output images (that is, the PIs projected by the MLA 104) from several different viewing angles compared to the ideal PIs (which are the ground-truth input images) through training on a set of example images. In some embodiments, the loss function is designed for perceptual image quality which leverages a combination of objectives to give a robust measure for image similarity with respect to human visual judgment. In this way, the end-to-end design framework disclosed herein intrinsically produces the best tradeoff between the performance metrics, and minimizes various image quality issues associated with the integral-imaging LFD 150.

Figure 11:
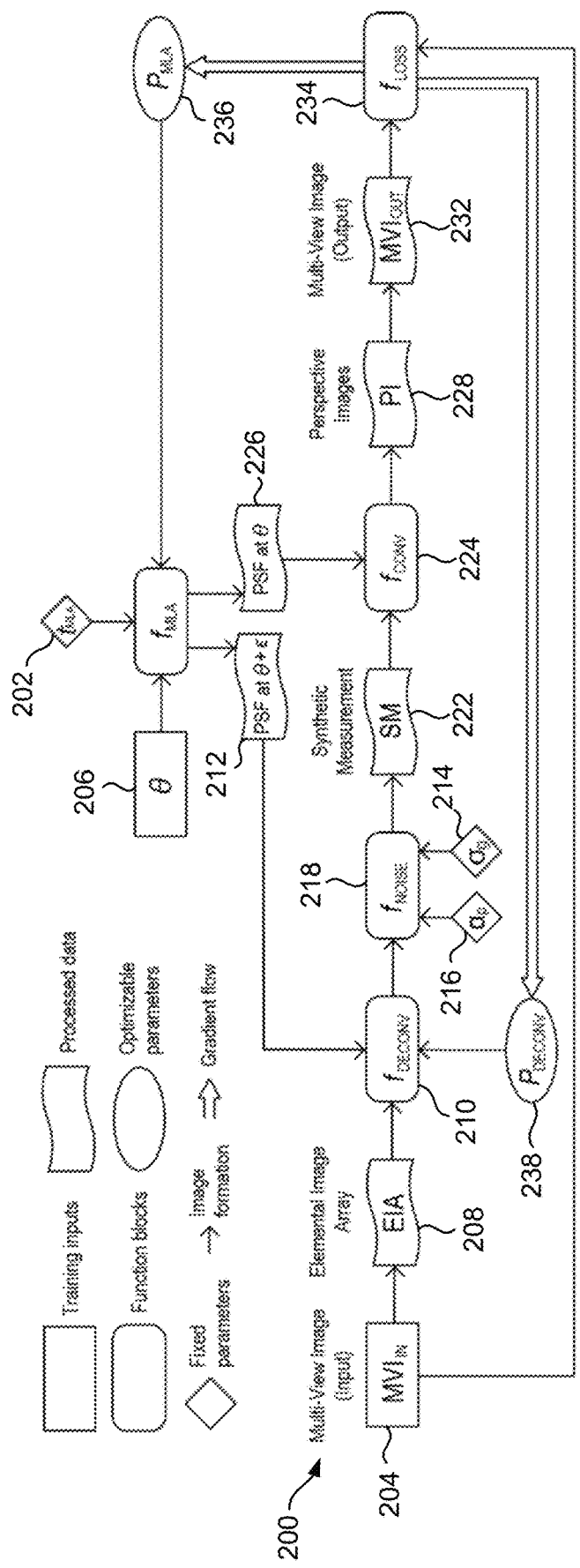
FIG. 11 is a schematic diagram showing an end-to-end design framework for optimizing both the MLA and the image-generation model to provide optimal image quality for the integral-imaging LFD shown in FIG. 10.

FIG. 11 is a schematic diagram showing the architecture of the end-to-end design framework 200 which may be deployed to one or more computing devices and operate through the interaction between training inputs, processed data, function blocks, optimizable parameters, and fixed parameters via links that represent image formation and gradient flow. Before describing the details of the end-to-end design framework 200, the symbols used therein are listed as follows.

Optimizable Parameters $P_{MLA}$: The parameters of the MLA 104 to be optimized to achieve the optimal displayed image quality. As will be described in more detail later, the MLA 104 may be constructed using refractive lenslets (with parameters $P_{REF}$), diffractive lenslets (with parameters $P_{DIF}$), or metasurface lenslets with parameters $P_{META}$).

$P_{DECONV}$: Parameters (for example, weights) of the deconvolution neural network (which is used for image pre-distortion) to be optimized to achieve the optimal display quality.

The above parameters are set to suitable initial values at the beginning of the training process and optimized through training.

Fixed Parameters $\sigma_g$: Gaussian noise of the pixel array 102.
$\alpha_p$: Poisson noise of the pixel array 102.

$t_{MLA}$: The transmission coefficient of a unit cell of each lenslet 108 of the MLA 104 as a function of a tunable structural parameter and the operating wavelength.

Training Inputs $MVI_{IN}$: The input multi-view images in the training set. Each input multi-view image is a combination of a plurality of ideal PIs (that is, the images that a viewer may see in ideal cases) of a particular 3D scene from respective viewing angles. In some embodiments, the ideal PIs are tiled to form the input multi-view images.

$\theta$: The set of viewing angles of the input multi-view images $MVI_{IN}$.

Processed Data

EIA: Elemental image array to be input to the display panel 102, which comprise a plurality of EIs to be projected by the MLA 104 to produce the directional views of the 3D images (that is, the PIs that a viewer may see). In these embodiments, a pixel-mapping algorithm is used to convert $MVI_{IN}$ to EIA.

SM: Synthetic measurement, which are images generated from pre-distorting the EIA and then adding display noise.

PI: Perspective images, which are images of the corresponding EIs projected by the MLA 104 for the viewer to observe from different viewing angles $\theta$. In these embodiments, the PIs are produced from performing convolution of the SM with point spread functions (PSFs) defined for different $\theta$.

$MVI_{OUT}$: The output multi-view images, each of which is a combination of a plurality of PIs. In some embodiments, the PIs are arranged as tiles of the output multi-view images. As will be described in more detail later, each output multi-view image $MVI_{OUT}$ is compared to the corresponding $MVI_{IN}$ to produce a loss value used for gradient descent in the neural network training process.

PSF at $\theta$: The PSFs of the MLA 104 at the set of viewing angles $\theta$.

PSF at $\theta+\epsilon$: The PSFs of the MLA 104 at vicinity $\theta+\epsilon$ of the set of viewing angles $\theta$, where $\epsilon$ is a small angle, which is used for patch-based deconvolution, where the display is divided into an M×M grid of overlapping patches and one PSF is assigned to each patch. The PSF at $\theta+\epsilon$ is effectively the PSF at the outer periphery of a patch.

FUNCTION BLOCKS (or MODULES)

$f_{MLA}$: The model that generates the point spread function (PSF) of the MLA 104, which depends on $P_{MLA}$.

$f_{NOISE}$: The noise model that adds Gaussian ($\sigma_g$) and Poisson ($\alpha_p$) noise to the input EIA, which represents the noise of the display panel.

$f_{DECONV}$: The deconvolution neural network for image pre-distortion.

$f_{CONV}$: The convolution function that implements the effect of the MLA 104 on the EIA with pre-distortion and display noise, which produces the directional views (that is, the PIs).

$f_{LOSS}$: Loss network that is employed to find the perceptual loss of $MVI_{OUT}$ compared to the $MVI_{IN}$ (ground truth).

As shown in FIG. 11, the fixed parameters 202 (including the transmission coefficients $t_{MLA}$, the display Gaussian ($\sigma_g$), and Poisson ($\alpha_p$) noise) are defined. After the training process starts, a set of training data including a plurality of multi-view images (block 204, that is, the $MVI_{IN}$) and the set of viewing angles θ (block 206) corresponding to the ideal PIs of the $MVI_{IN}$) are input to the end-to-end design framework 200. As described above, each input multi-view image $MVI_{IN}$ is a combination of a plurality of ideal PIs, and each ideal PI corresponds to a viewing angle θ.

For each $MVI_{IN}$, the end-to-end design framework 200 then performs the following steps:

(1) converting $MVI_{IN}$ to EIA (block 208) (in other words, converting the plurality of ideal PIs of the $MVI_{IN}$ to a plurality of EIs of the EIA) by using a pixel-mapping algorithm;

(2) pre-distorting the EIA by using the deconvolution neural network $f_{DECONV}$ (block 210) which takes in the current weights $P_{DECONV}$ (block 238) and a plurality of PSFs at various θ+ϵ (block 212);

(3) adding Gaussian ($\sigma_g$) and Poisson ($\alpha_p$) display-noise (blocks 214 and 216, respectively) to the pre-distorted EIA by $f_{NOISE}$ (block 218) to generate SM (block 222);

(4) using the convolution function $f_{CONV}$ (block 224) to convolve the SM with PSFs at different values of viewing angle θ (block 226; PSFs being generated by $f_{MLA}$ based on the current parameters $P_{MLA}$) to generate the perspective images PIs (block 228; one image for each θ);

(5) combining the PI (for example, tiling the PIs together) to form $MVI_{OUT}$ (block 232);

(6) comparing $MVI_{OUT}$ and $MVI_{IN}$ (in other words, comparing the ideal PIs of $MVI_{IN}$ and the PIs generated at block 228) using $f_{LOSS}$ (block 234) to generate the loss. The gradients of the loss are used to adjust the MLA parameters $P_{MLA}$ (block 236) of $f_{MLA}$ and the weights $P_{DECONV}$ (block 238) of $f_{DECONV}$.

In the next epoch, training steps (1) to (6) are executed for another $MVI_{IN}$.

In above training process, steps (1) and (2) relate to the image-generation model used by the circuitry 152 and steps (3) and (4) simulate the display panel 102 and the MLA 104. The training steps (1) to (6) are executed for each $MVI_{IN}$ of the training set until the loss is minimized. The optimal $f_{MLA}$ (that is, the model $f_{MLA}$ with optimized parameters $P_{MLA}$ (block 236)) that characterizes the MLA 104 and the optimal $f_{DECONV}$ (that is, the model $f_{DECONV}$ with optimized parameters $P_{DECONV}$ (block 238)) that describes the image-generation model are then jointly obtained, and the training process is terminated.

Thus, the end-to-end design framework 200 uses inverse design and joint optimization of both the optics hardware and the image-generation model for an integral-imaging LFD 150. By modifying the image-generation model to generate pre-distorted images to display, physical limitations of the optics hardware may be overcome to improve the image quality that otherwise cannot be achieved. On the other hand, the optimized MLA 104 may adapt to the characteristics of the images generated through the image-generation model for obtaining improved image quality.

Compared to using only one of computational imaging techniques or inverse design of the optics, joint-optimization of both the MLA 104 and the image-generation model as disclosed herein leads to improved integral-imaging LFDs 150 display with superb specifications of standard image-quality metrics that characterize the integral-imaging LFDs 150.

Figure 12:
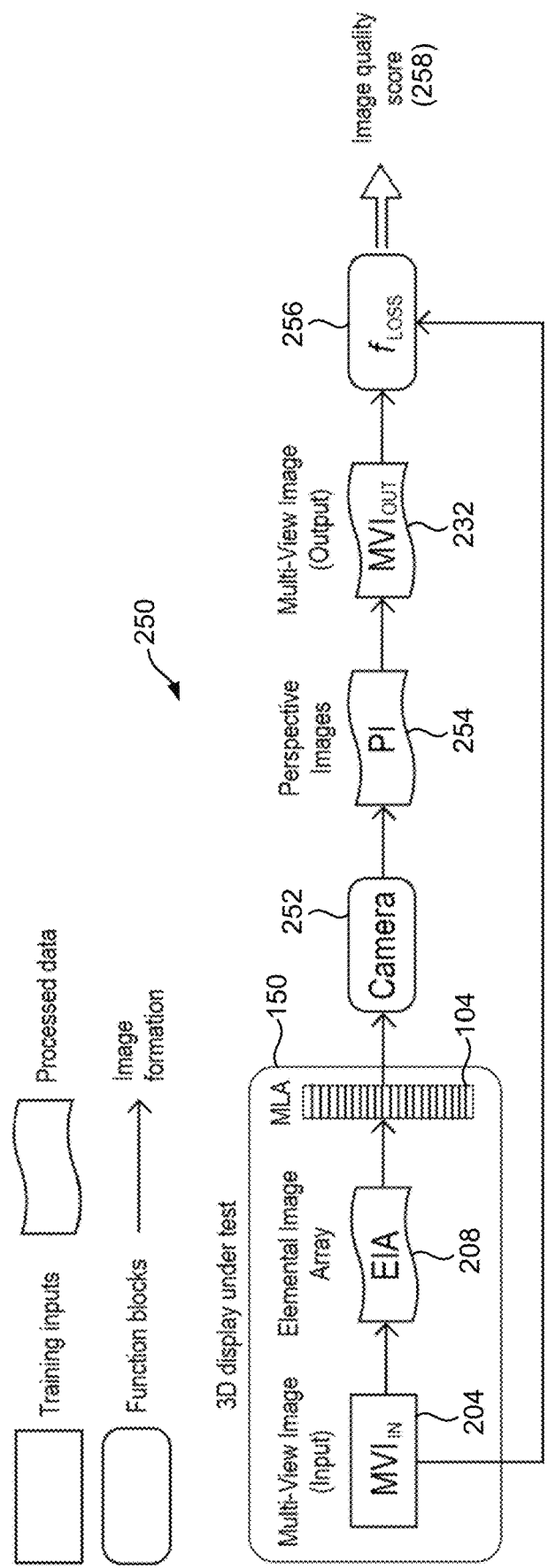
FIG. 12 is a schematic diagram showing a method and an apparatus for evaluating image quality of the integral-imaging LFD shown in FIG. 10 by comparing captured images from different perspectives with the input multi-view images.

In some embodiments as shown in FIG. 12, a method and an apparatus may be used for evaluating image quality of the integral-imaging LFD 150 by comparing captured images from different perspectives with the input multi-view images.

As shown, the integral-imaging LFD 150 processes the input MVIs 204 using the image-generation model as described above and display the obtained EIs 208 through the MLA 104. One or more cameras 252 captures PIs 254 from various viewing angles. The captured PIs 254 are combined to form the output MVIs 232. Then, the input MVIs 204 and the output MVIs 232 are compared using a loss network 256 (which may or may not be the same loss network 234 shown in FIG. 11) to obtain the image-quality evaluation results 258 such as image-quality scores.

By using a customized neural network and loss function, the image-quality evaluation method and apparatus 250 shown in FIG. 12 obtains an image-quality metric for the viewer-observable images (that is, the PIs) which intrinsically takes into account the range of performance metrics that characterize viewing experience.

As those skilled in the art will appreciate, the image-quality evaluation method and apparatus 250 do not require the use of dedicated reference patterns or multiple measurements that are otherwise used in prior art. Rather, the image-quality evaluation method and apparatus 250 take into account many factors to assess the viewer-observable images and produce an aggregate score to quantify the overall 3D-display experience by capturing different perspective views. In some embodiments, additional measurements may be further performed to assess for more specific display metrics if required.

The integral-imaging LFD 150 and the end-to-end design framework 200 provide various advantages and benefits such as:

jointly optimizing both the projection optics (for example, MLA 104) design and image-generation (pre-distortion) model to enhance the display image quality of the 3D integral-imaging LFD 150, which is achieved by using the neural network architecture that trains the parameters of both the MLA 104 and the deconvolution neural network 210 one after the other during each epoch;

holistically optimizing a range of performance metrics that together characterize the image quality and viewing experience by directly comparing the output (reconstructed) images from several different viewing angles (pre-distorted, then projected with MLA 104) to the ground-truth input images, and then generating loss values from a loss function designed for perceptual image quality with respect to human visual judgment;

generating the required performance metric that characterizes display-image quality and also performing the optimization without relying on simulations using additional optical lens design software, which is achieved by generating output images at different viewing angles by convolution of input images with the PSF of the MLA 104 and comparing the output images with the input images via the loss function.

The quantitative evaluation of 3D displays is still a nascent field. However, it may be important to have a standard of metrology so that different prototypes and products can be compared for benchmarking and quality assurance, thereby facilitating the development of the 3D display industry. Thus, the image-quality evaluation method and apparatus 250 disclosed herein may contribute to existing standards such as the Information Display Measurements Standard (IDMS) or other standards of quantifying the performance of 3D electronic displays.

As those skilled in the art understand, the MLA 104 may be implemented using various techniques. In the following, several examples of the end-to-end design framework 200 are described for different implementations of the MLA 104.

C. EXAMPLE 1

Refractive MLA

Figure 13:
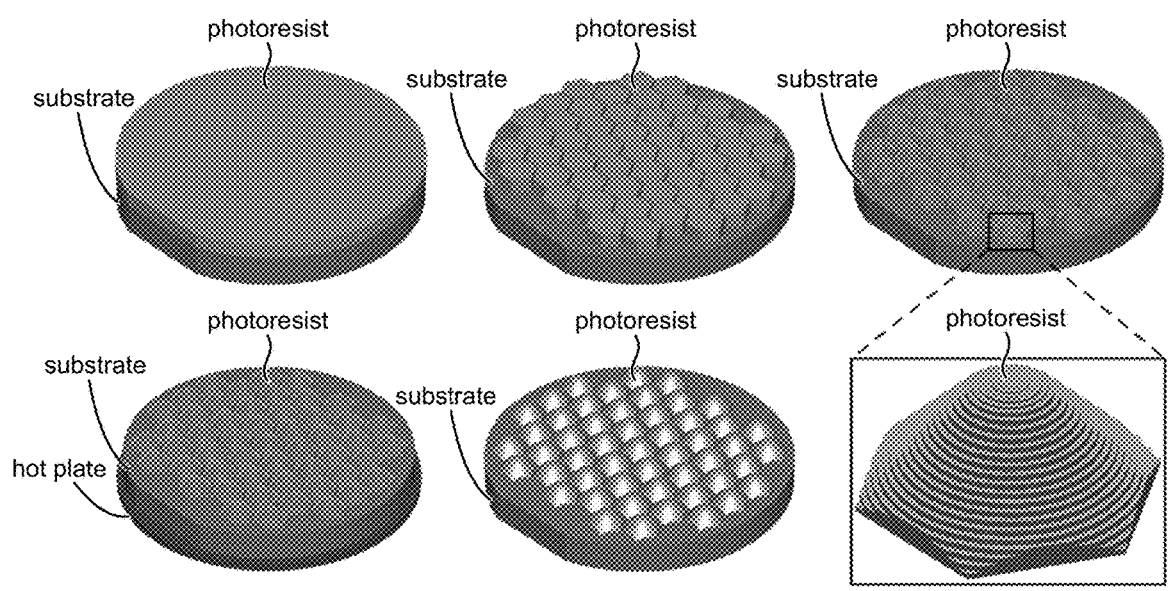
FIG. 13 is a schematic diagram showing a refractive MLA fabricated by maskless grayscale lithography.

In this example, the MLA 104 comprises dielectric refractive lenslets 108, which may be made of different materials such as polymer and photoresist, and fabricated by different techniques such as maskless grayscale lithography of polydimethylsiloxane (PDMS) (FIG. 13; see Reference [14]), thermal resist reflow of positive photoresist on glass plate, and polymer micro-droplets wetting of Norland Optical Adhesive (NOA 65). Different implementations of refractive MLA 104 may be used to target the desired phase profile for achieving some degree of aberration correction. For example, one technique fabricates the MLA 104 on a curved surface using femtosecond laser technology, and another technique uses molding to achieve aspherical surfaces by controlling the temperature. One example of refractive MLA based 3D integral-imaging LFD is a product by FOVI3D of Austin, TX, USA, which uses a two-layer stacked refractive MLA to reduce optical aberrations (see Reference [15]).

Figures 14A, 14B, 14C:
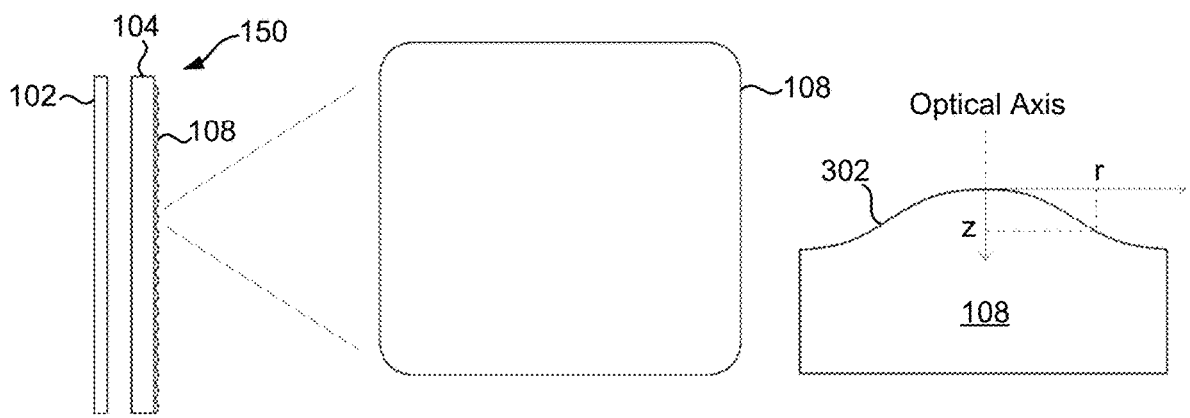
FIG. 14A is schematic side view of an integral-imaging LFD shown in FIG. 10 using a plurality of refractive lenslets as the MLA.
FIGS. 14B and 14C are schematic plan view and cross-sectional view, respectively, of a refractive lenslet shown in FIG. 14A.

In some embodiments, the end-to-end design framework 200 may be used for optimizing the refractive lenslets 108 of the MLA 104. FIG. 14A is schematic side view of an integral-imaging LFD 150 using refractive lenslets 108 as the MLA 104. FIGS. 14B and 14C are schematic plan view and cross-sectional view, respectively, of a refractive lenslet 108. As shown, each refractive lenslet is constructed from a refractive surface 302 made of a specific material such as glass, polymer, and/or the like. The shape of the surface 302 may generally be aspherical with the surface sagitta value (sag) z as a function of the radial distance from the optical axis r described by $$z(r) = \frac{r^2 \rho}{1 + \sqrt{1 - (1+\kappa)(r\rho)^2}} + \sum_{n=1}^{N} A_{2n} r^{2n} \quad (1)$$

where $\rho$ is the curvature and is the reciprocal of the radius of curvature $r_0$ (that is, $\rho=1/r_0$), and $\kappa$ is the conic constant that describes whether the surface is of spherical, elliptical (such as prolate or oblate), parabolic, hyperbolic, or the like. The second term in Equation (1) is a series expansion as a function of the radial distance from the optical axis r, which adds monotone sagitta parts as deviations of the basic conic surface defined by aspheric coefficients $A_{2n}$. Equation (1) is ISO standardized and used in several optical design software as well as standard description on optical drawings.

In this example, the parameters and function blocks of the end-to-end design framework 200 are adapted to the refractive lenslets 108 of the MLA 104. More specifically, $f_{MLA}$ in this example is the model $f_{REF}$ that generates the PSF for the refractive MLA 104. $P_{MLA}$ are the coefficients $P_{REF}$ of the optimizable sag function of the refractive MLA 104, and in particular, are the coefficients of the refractive lenslets 108 as given in Equation (1). In other words, the coefficients $P_{MLA}$ are thus $\rho$, $\kappa$, and $A_{2n}$.

In this example, $t_{MLA}$ is $t_{REF}$ that generates the refracted (output) ray angle as a function of the input light wavelength, the incident-ray angle $\theta$, the lens refractive index, and the slope of the lens surface. The model $f_{REF}$ performs ray tracing on the refractive surface based on the function $t_{REF}$ for light rays incident at different locations r and converts the resulting ray spot diagram into the PSF.

In addition to the advantages and benefits described above in subsection B, in this example, as $t_{REF}$ generates the refracted (output) ray angle as a function of several parameters, no prior simulations are required, unlike Example 3 described below where $t_{META}$ is a set of transmission coefficients determined from prior simulations. Thus, the end-to-end design framework 200 may be used with reduced time and effort from not having to customize simulations for specific designs (for example, shapes of the nanofins of the metasurface in Example 3) prior to the actual neural network training.

D. EXAMPLE 2

Diffractive MLA

In this example, the MLA 104 comprises dielectric diffractive lenslets 108 which operates by means of interference and diffraction to produce arbitrary distributions of light. FIG. 15 shows an example of a diffractive lenslet 108 (see Reference [16]). A large-scale diffractive MLA 108 may be fabricated on chalcogenide glass by hot imprinting and glass molding. Diffractive MLAs 108 have been applied to spatial light modulation and super-resolution imaging. Different works have also pursued engineering diffractive lenses to be achromatic and correcting for monochromatic aberrations such as spherical aberration.

Figure 16C:
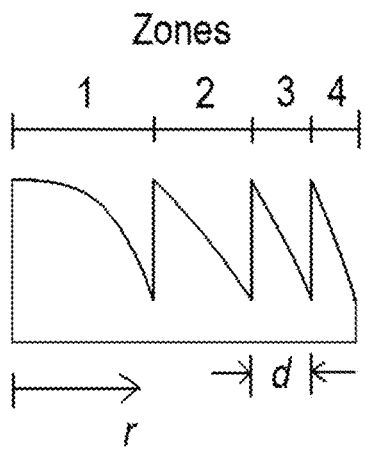
FIGS. 16C to 16E are schematic cross-sectional views of various examples of the diffractive lenslet shown in FIG. 16A having the kinoform surface, four-level binary surface, and two-level binary surface, respectively.
Figure 16D:
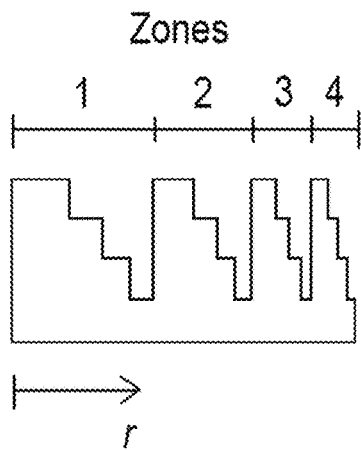
Figure 16E:
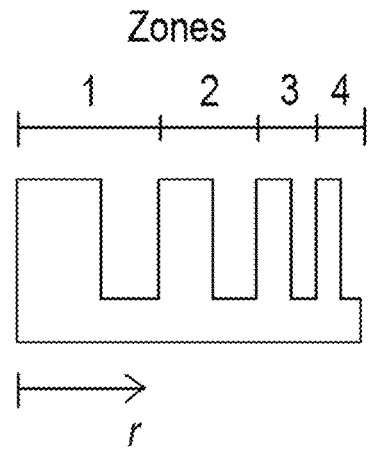

FIG. 16A is schematic side view of an integral-imaging LFD 150 using diffractive lenslets 108 as the MLA 104. FIGS. 16B is a schematic plan view of a diffractive lenslet 108. FIGS. 16C to 16E are schematic cross-sectional views of various examples of the diffractive lenslet 108 showing the kinoform surface, four-level binary surface, and two-level binary surface, respectively, of the diffractive lenslet 108. As shown in FIGS. 16A to 16E, the diffractive lenslet 108 comprises radial gratings that become finer towards the edge of the lens as the radial distance from the center of the lens increases. As such, the diffraction angle is continuously changed, which translates to the required phase profile of the lens.

Each diffractive lenslet 108 is a very thin element made of a suitable material such as glass, polymer, or the like, with a total thickness equal to $h=\lambda/(n-1)$, where $\lambda$ is the operating wavelength and n is the material refractive index. The diffractive power of a diffractive lens surface introduces continuous phase change across the surface according to the following equation:

$$\Phi(r) = M \sum_{n=1}^{N} A_{2n} r^{2n} \quad (2)$$

where r is the radial distance from the center of the lenslet 108 (optical axis), $A_{2n}$ are coefficients, and M is a scaling factor. A diffractive lenslet 108 is composed of a series of diffractive zones with varying grating periods as a function of radial distance from the optical axis that become finer towards the edge of the lens. The diffraction angle depends only on the period of the grating, but not on the shape of each grating, and it is given by $$n_2 \sin(\theta_2) - n_1 \sin(\theta_1) = \frac{M\lambda}{d} \quad (3)$$

where $n_1$ is the refractive index of the medium where the incident light originates from, $n_2$ is the refractive index of the medium after diffraction on the grating, $\theta_1$ is the light incident angle, $\theta_2$ is the diffraction angle, M is the diffraction order, $\lambda$ is the wavelength, and d is the grating period. Equation (3) is Snell's law for refraction, plus an additional ray bending term representing diffraction.

The radial coordinates of each diffraction zone are at the points when the phase reaches $2\pi$. An ideal diffractive surface is one in which the surface profile change is continuous, in which the size of the discrete steps are infinitesimally small or at least very small compared to the wavelength. This is known as a kinoform surface (see FIG. 16C). In order for the diffractive lenslet 108 to be easily fabricated, discrete levels may be used for the surface profile, such as four-level or two-level binary surface profiles as shown in FIGS. 16D and 16E, respectively.

In this example, the parameters and function blocks of the end-to-end design framework 200 are adapted to the diffractive lenslets 108 of the MLA 104. More specifically, $f_{MLA}$ in this example is the model $f_{DIF}$ that generates the PSF for diffractive MLA 104. $P_{MLA}$ are the coefficients $P_{DIF}$ of the optimizable phase function of the diffractive MLA 104. The fixed transmission coefficient $t_{MLA}$ at each radial location of each diffractive lenslet 108 of the MLA 104 is represented by $t_{DIF}$ in this example, and is the complex transmission coefficient (phase shift and amplitude transmission) that is determined by the local grating period.

In addition to the advantages and benefits described above in subsection B, in this example, once the optimized phase profile $P_{DIF}$ is determined for each epoch of the training process performed by the end-to-end design framework 200, the optimized phase profile $P_{DIF}$ may be directly converted to the structure of the diffractive lenslets 108 (that is, the local grating periods) by $f_{DIF}$ without further simulations such as ray tracing. This is due to the technical feature of diffraction gratings that each diffraction angle and thus phase value is associated with a specific grating period.

In this example, the diffractive MLA 108 has very thin form-factor on the order of less than one (1) millimeter (mm) which is achieved by the inherent technical feature of inducing phase shift using diffraction gratings that are each approximately a wavelength or less in height, on top of a substrate that may be a few hundred microns in thickness.

E. EXAMPLE 3

Metasurface MLA

Figure 17A:
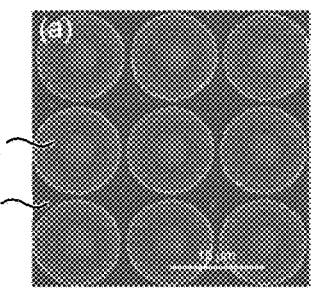
FIGS. 17A and 17B show scanning Electron Microscope (SEM) images of a metasurface MLA (metalens array) in different scales.
Figure 17B:
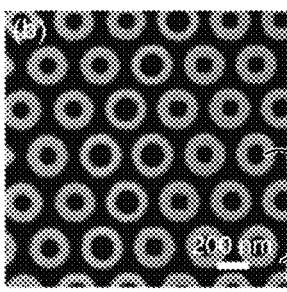

In traditional refractive lens design, the task of minimizing aberrations involves stacking two or more lenses together, using aspherical surfaces, or both to increase the number of surfaces and thus the degrees of freedom. These requirements significantly complicate the fabrication of these devices, which may not be practical for a MLA 104 that contains hundreds to thousands or more lenslets 108. In recent years, research in optical metasurfaces have accelerated and commercialization of the technology has begun. One prominent application is to use metalenses as the lenslets 108 (also denoted a "metalens array") of the MLA 104. FIGS. 17A and 17B respectively show the Scanning Electron Microscope (SEM) images of a metasurface MLA 104 (metalens array) in different scales (see Reference [17]; also see Reference [9]).

As shown in FIGS. 17A and 17B, a metasurface 400 is a flat optical device that consists of an array of subwavelength structures 402 (that is, an array of structures in the nanoscale for optical wavelengths; also denoted "nanofins" hereinafter) distributed on the surface of a planar substrate 404. The specific structures and arrangement of these nanostructures 402 on the surface 404 are designed such that the phase, amplitude, polarization, and other properties of an incident beam of light can be precisely manipulated as it is transmitted or reflected from the surface 404.

Figure 18A:
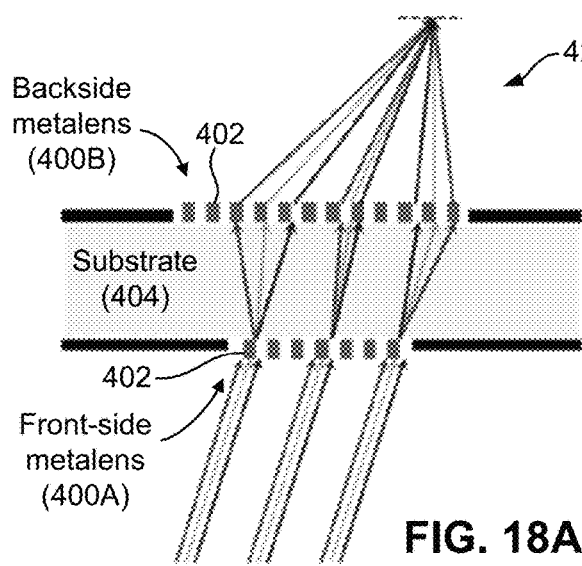
FIG. 18A is a schematic cross-sectional view of an exemplary optical devices having two metasurface layers coated on opposite surfaces of a substrate for correcting chromatic and achromatic aberrations.
Figure 18B:
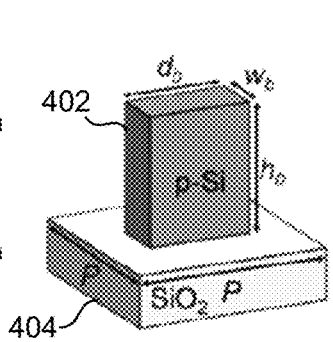
FIG. 18B and 18C are schematic perspective view and plan view of a nanofin of the metasurface layers shown in FIG. 18A.
Figure 18C:
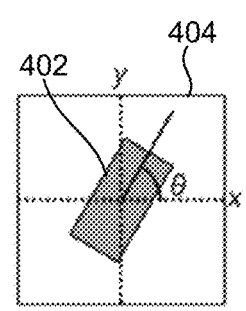

In the case of a metalens, the phase distribution is engineered through the nanofins design and their placements such that it mimics a refractive lens that focuses a collimated beam at the focal spot on the other side. One important advantage of the metalens is that the thickness can be on the order of less than one (1) mm that includes the nanofins 402 typically less than one (1) micrometer (μm) in height and a thin glass substrate 404. Also, the phase and dispersion characteristics of the metalens may be precisely engineered by controlling the shapes and distribution of the nanofins 402, such that an achromatic lens may be engineered using a single layer, which is a significant improvement over a stacked assembly of several refractive lenses that would be at least several centimeters in total thickness. There has also been work on designing metalenses 400 that can correct for some monochromatic aberrations to increase the FoV at a single operating wavelength. More recently, researchers have attempted to design metalenses 400 that correct for both chromatic and monochromatic aberrations for large color range and wide FoV imaging. FIGS. 18A and 19A show the optical devices 420 and 420' having two metasurface layers 400A and 400B coated on opposite surfaces of a substrate 404 for correcting chromatic and achromatic aberrations. FIGS. 18B and 18C show a nanofin 402 in cylindrical shape (see References [8]), and FIGS. 19B and 19C show a nanofin 402 in cylindrical shape (see References [18]). It is noted that the conventional metasurfaces are designed to be aberration-corrected only at discrete wavelengths rather than over a continuous range of wavelengths.

Metasurface may be used for forming the MLA 104 in which each individual metalens may be corrected for both chromatic and monochromatic aberrations to offer wide FoV full-color performance over the entire visible range. Overall, there are several advantages of metasurface MLA compared to single-layer refractive MLA, which are highlighted in Table 1 below.

TABLE 1

COMPARISON OF PERFORMANCE METRICS BETWEEN METASURFACE AND REFRACTIVE MLAS IN TERMS OF THE APPLICATION TO 3D INTEGRAL-IMAGING LFDS.

| PERFORMANCE METRIC | METASURFACE MLA | REFRACTIVE MLA (SINGLE-LAYER) |
|---|---|---|
| Operation bandwidth | 300 nm | Less than 50 nm |
| Field of view (FoV) | 60° | Less than 20° |
| Polarization sensitivity | Insensitive | Insensitive |
| Fabrication | Planar semiconductor process (electron beam, UV, or nanoimprint lithography) High uniformity over large areas | Direct methods (thermal reflow, microplastic embossing, microdroplet jetting): Difficult to achieve required uniformity over a large area and to control the accuracy of the microlenses shape Indirect methods (MEMS based, ultraprecision machining): Further improvement needed to |

TABLE 1-continued

COMPARISON OF PERFORMANCE METRICS BETWEEN
METASURFACE AND REFRACTIVE MLAS IN TERMS OF
THE APPLICATION TO 3D INTEGRAL-IMAGING LFDS.

| PERFORMANCE METRIC | METASURFACE MLA | REFRACTIVE MLA (SINGLE-LAYER) |
|---|---|---|
| | | reduce surface fluctuations and roughness |

Despite the advantages of metasurfaces, progress needs to be made in terms of, for example, focusing quality, efficiency, and increase in both the aperture size and numerical aperture (NA). Moreover, in addition to minimizing the chromatic and monochromatic aberrations of each metalens of the MLA 104, there are many other metrics that also characterize how good the viewing experience. It is unclear how those metrics can be optimized via the metasurface MLA design, as there are no straightforward correlations between the optical performance of the individual metalenses and the various display metrics.

The limitation of forward design (conventional) approach is that it is difficult or even impossible to find the exact mathematical function to target, that is, the phase function of the metasurface MLA that would provide a "good viewing experience" for the integral-imaging LFD. A promising strategy to solve this problem is to employ computational techniques to design metasurfaces, where the design process starts from the desired functionality and the nanofins are designed based on optimizing for a specified figure of merit (FoM). Such design methodologies, often referred to as inverse design, have been employed to design metasurfaces for high efficiency periodic gratings, monochromatic lenses, point spread function (PSF) engineered optics, and achromatic lenses.

Inverse design can outperform the conventional approach for the design of metasurfaces, but there are limited experimental demonstrations of invers-designed metasurfaces exhibiting superior performance over traditional refractive optics. For example, recently demonstrated inverse-designed metalenses exhibit high efficiency, but it is still not higher than that of a traditional refractive lens. Moreover, demonstrated inverse-design methods are still limited in terms of the achievable aperture sizes, and so far the optimization has been for intermediate FoM such as the focal spot intensity which may not necessarily translate to improving the viewing experience that would be characterized by more advanced metrics.

In order to alleviate the physical limitations of an optical system or reduce its complexity, computational imaging may be utilized in which much of the aberration correction and functionality of the optical hardware is shifted to post-processing in the software domain, enabling high-quality images with significantly simpler optics.

Figure 20B:
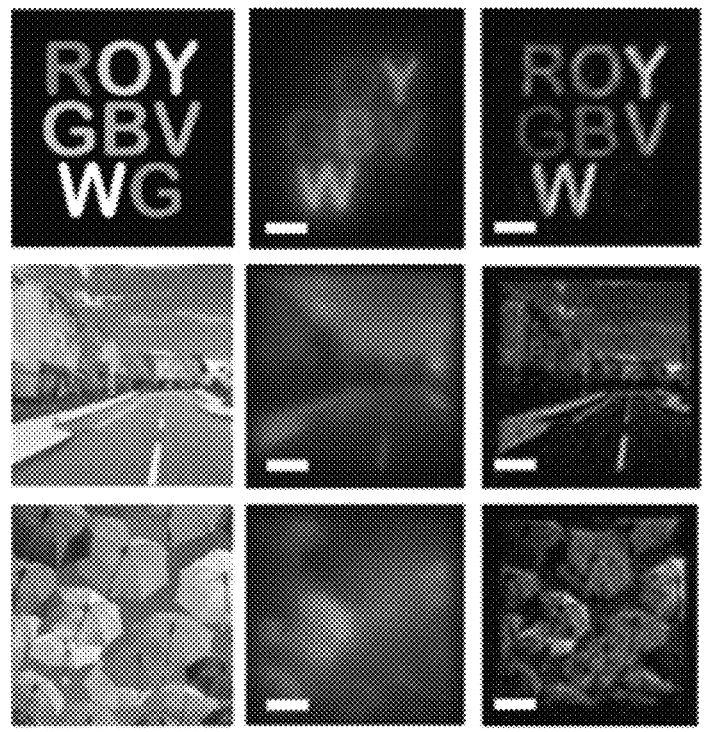
Figure 21:
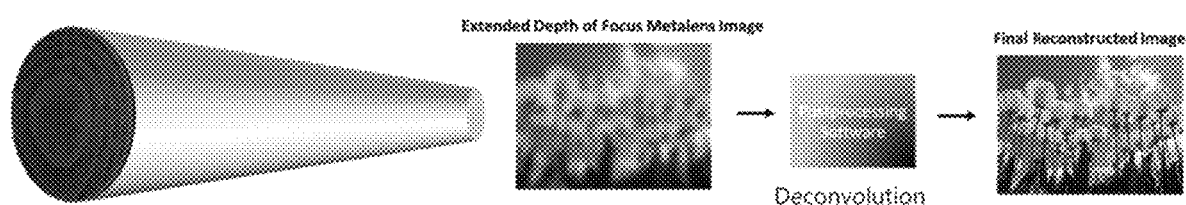
FIG. 21 shows process of imaging with an extended DoF metalens and the subsequent post-processing to reconstruct the image.

Recently, the concept of combining computational imaging with metasurface optics has been demonstrated in several works; in particular, for the engineering of metalenses along with post-processing techniques to increase the bandwidth, alleviate the tradeoff between aperture size and NA, and increase the FoV. The initial idea is an extended DoF metalens design engineered by adding a cubic phase mask to the standard hyperboloidal lens phase function, which allows for the modulation transfer function (MTF) to be insensitive to misfocus (for example, chromatic focal shift). Thus, the PSF is constant across the entire visible wavelength range and the output image would be achromatic (see FIGS. 20A and 20B; reproduced from Reference [19]). After imaging with the extended DoF metalens, post-processing (deconvolution) such as by the Wiener filter is then performed to reconstruct the image (see FIG. 21 and Reference [20]). The limitation of the cubic phase mask is that it produces a transversely asymmetric PSF which leads to asymmetric artifacts and distortions in imaging even after deconvolution. A solution to overcome this problem by utilizing phase masks with rotationally symmetric PSFs, including shifted axicon, log-asphere, and SQUBIC, has been demonstrated, which showed increased optical bandwidth and better image quality (see FIG. 22 and Reference [21]). To improve the performance even further, a cylindrical extended DoF metalens that generates a lens-like PSF has been demonstrated which was inverse designed by optimizing for the FoM specified as the intensity at eight linearly spaced points along the optical axis centered around the focal length.

The previous techniques of forward and inverse designed metalenses combined with computational imaging enable full-color imaging without stringent aperture limitations. However, they are limited to a FoV below 20° and the reconstructed spatial resolution is an order of magnitude below that of conventional refractive optics. To approach the performance of conventional bulky optics, Reference [13] demonstrated the co-optimization of the metasurface and deconvolution algorithm with an end-to-end differentiable model of image formation and computational reconstruction (see FIG. 23; reproduced from Reference [13]). The approach is different from inverse designed meta-optics in that the FoM for optimization is in fact the quality of the final image as opposed to intermediate metrics that characterize the metalens itself. The result is a metasurface design that combines the widest FoV for full-color imaging while simultaneously achieving the largest demonstrated 0.5 mm, f/2 aperture. The reconstructed images are accurate compared to ground truth acquisitions using a high-quality six-element compound refractive optic, in a device volume that is more than 5-orders of magnitude smaller than the compound optic.

In this example, each lenslet 108 of the MLA 104 comprises a metasurface. FIG. 24A is a schematic side view of an integral-imaging LFD 150 using metasurface lenslets 108 as the MLA 104. FIG. 24B is a schematic plan view of a metasurface lenslet 108. FIGS. 24C to 24E are schematic perspective views of various types of a nanofin 402 of the metasurface lenslet 108, including propagation, geometric, and resonance phase types.

As shown, each metasurface lenslet 108 (also called a "metalens") is constructed from an array of unit cells 422 and each unit cell 422 comprises a nanofin 402 (that is, nanoscale fin) with a specific shape and made of a specific material (such as titanium dioxide: $TiO_2$). The nanofins 402 sit on top of a substrate 404 made from a specific material (for example, silicon dioxide ($SiO_2$)) with refractive index lower than the nanofins 402. The shapes of the nanofins 402 depend on the type of metasurface being implemented:

Propagation phase type metasurface in which the nanofin 402 is a post with a certain height and symmetric cross-section (for example, circle, square, hexagon, or the like). The phase shift is dependent on the cross-sectional size of the nanofin 402. This type of metasurface is polarization-insensitive.

Geometric (Pancharatnam-Berry) phase type metasurface in which the nanofin 402 is a post with a certain height and asymmetric across-section (for example, rectangle). This type of metasurface requires the input light to be circularly polarized, and the phase shift is dependent on the rotation angle of the nanofin 402, which means it is polarization-sensitive.

Resonance phase type metasurface in which the nanofin 402 has all three dimensions that are similar (that is, cube, sphere, or the like). This type of metasurface is highly wavelength sensitive and is designed to operate at a certain resonant wavelength. The phase shift is dependent on the overall size of the nanofin 402.

In this example, the parameters and function blocks of the end-to-end design framework 200 are adapted to the diffractive lenslets 108 of the MLA 104. More specifically, $f_{MLA}$ in this example is the model $f_{META}$ that generates the PSF for metasurface MLA 104. $P_{MLA}$ are the coefficients $P_{META}$ of the optimizable phase function of the metasurface MLA 104. The fixed transmission coefficient $t_{MLA}$ of each unit cell 422 of each metalens 108 of the MLA 104 is represented by $t_{META}$ in this example, and is a function of both the input light wavelength and the dimensions and/or orientation of the nanofin 402 in that unit cell 422. In the case of propagation phase type metasurface, $t_{META}$ is a function of the cross-sectional width d of the nanofin 402 as the height h is fixed. For geometric phase type metasurface, $t_{META}$ is a function of the cross-sectional dimensions l and w as well as the rotation angle φ of the nanofin 402, with the height h fixed. For resonance phase type metasurface, $t_{META}$ is a function of all three dimensions l, w, and h of the nanofin 402.

In addition to the advantages and benefits described above in subsection B, in this example, the integral-imaging LFD 150 and the end-to-end design framework 200 provide great flexibility in controlling the phase and amplitude profile of the metasurface lenslets 108 by tailoring the structure and orientation of nanofins 402 at each subwavelength-sized unit cell 422.

Metasurfaces may be manufactured by planar fabrication processes such as photolithography and nanoimprint lithography. The complexity of the designed phase profile does not affect the difficulty in fabrication given a defined library of nanofin structures that span the phase shift values of 0 to 2 π and are feasible with the tolerances of a particular fabrication process as the functions of metasurfaces are based on nanofins 402 on its surface that have the same height but that the phase can be tuned by modifying the lateral dimensions of each nanofin 402.

Once the desired phase profile $P_{META}$ is determined for each epoch of the neural network training, it may be directly converted to the structure of the metasurface (that is, the nanofins distribution) by $f_{META}$ without further simulations such as ray tracing because, in metasurfaces, each phase value is associated with a specific nanofin shape and/or orientation.

The metasurface MLA 104 has very thin form-factor on the order of less than one (1) mm which is achieved by the inherent technical feature of inducing phase shift using nanofins 402 that are each a few microns or less in height, on top of a substrate that can be a few hundred microns in thickness.

F. EXAMPLE 4

Non-Uniform MLA

Unlike the previous examples wherein the lenslets 108 of the MLA 104 are of the same type, the MLA 104 in this example is a non-uniform MLA and comprises different lenslets 108 such as lenslets 108 of different phase profiles and/or sizes. For example, the MLA 104 may comprise refractive, diffractive, or metasurface lenslets 108 with different phase profiles and/or sizes. Accordingly, $P_{MLA}$, $f_{MLA}$, and $t_{MLA}$ may be determined based on the type of the lenslets (for example, refractive, diffractive, or metasurface) as described in previous sub-sections.

In addition to the advantages and benefits described above in subsection B, in this example, the integral-imaging LFD 150 and the end-to-end design framework 200 provide more design degrees-of-freedom in optimizing the integral-imaging LFD 150 to obtain improved image quality and viewing experience because, compared to Examples 1 to 3, the parameters $P_{MLA}$ in this example may comprise many more parameters that can be tuned during the optimization process. For example, the lenslets 108 may be partitioned into a plurality of lenslet groups with each lenslet group having their own optimized parameters $P_{MLA}$.

G. Near-Eye 3D Integral-Imaging LFD for Augmented and Virtual Reality (Ar/Vr)

In some embodiments, the 3D integral-imaging LFD 150 may be used as a near-eye 3D integral-imaging LFD, which may provide attractive features such as ultra-compact volume and freedom from the vergence accommodation conflict (VAC) for head-mounted displays (HMDs) with virtual or augmented reality functions. This is in contrast to currently available HMDs that only provide binocular parallax rather than full parallax, and thus cannot solve the problem of VAC. For optical-combiner-based HMDs, the volume rapidly increases with the widening of FoV which leads to a bulky device. For waveguide-based HMDs, the FoV is limited by the angular diffraction efficiency of the coupling components and the establishment condition of total internal reflections.

By using the end-to-end design framework 200, the near-eye integral-imaging LFD 150 may overcome the shortcomings of conventional near-eye integral-imaging LFDs such as insufficient visual resolution, drop-off of resolution verse FoV, limited depth of field (DoF), and/or the like.

Figure 25A:
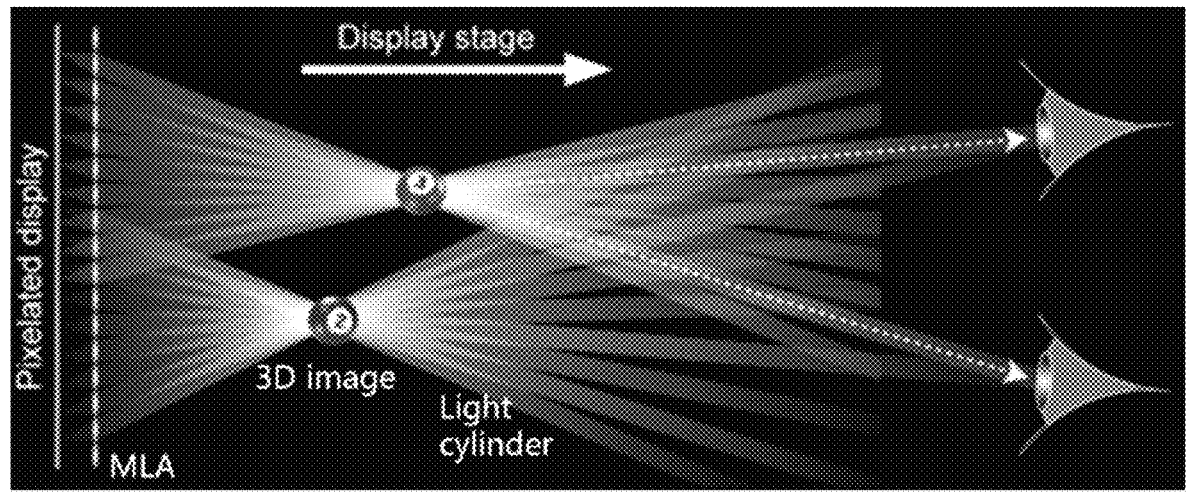
FIG. 25A shows a 3D integral imaging LFD using MLA for far-eye viewing that produces real images.
Figure 25B:
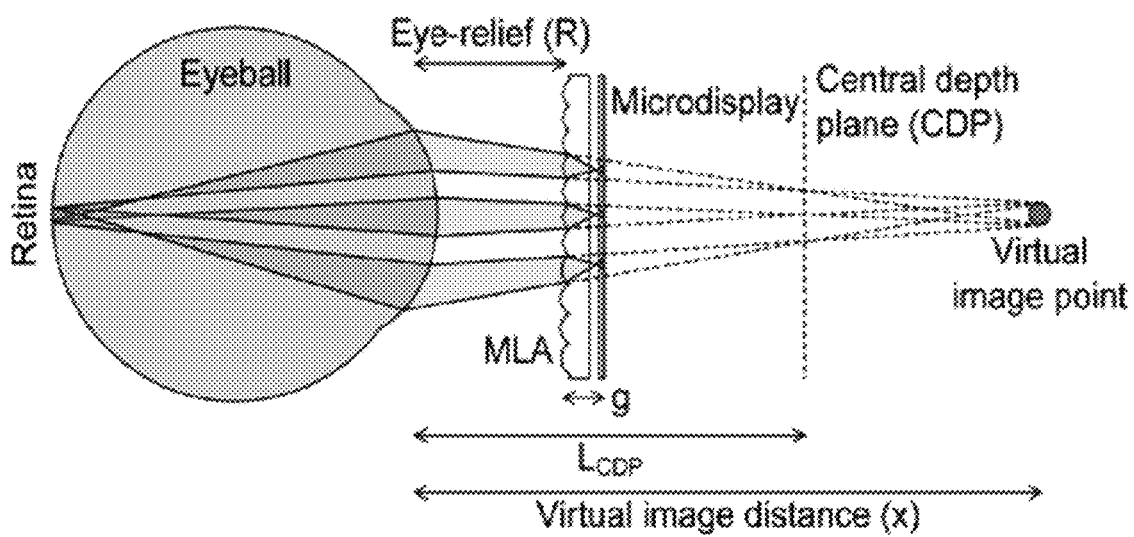
FIG. 25B shows a near-eye 3D integral-imaging LFD using MLA that produces virtual images.

The main difference between the integral-imaging LFD 150 for viewing at a distance therefrom (denoted "far-eye integral-imaging LFD" hereinafter) and the near-eye integral-imaging LFD 150 in these embodiments is that the far-eye integral-imaging LFD typically produces real images that appear in front of the display plane (see FIG. 25A and Reference [22]), while the ear-eye integral-imaging LFD produces only virtual images behind the display plane (FIG. 25B and Reference [23]).

Figure 26A:
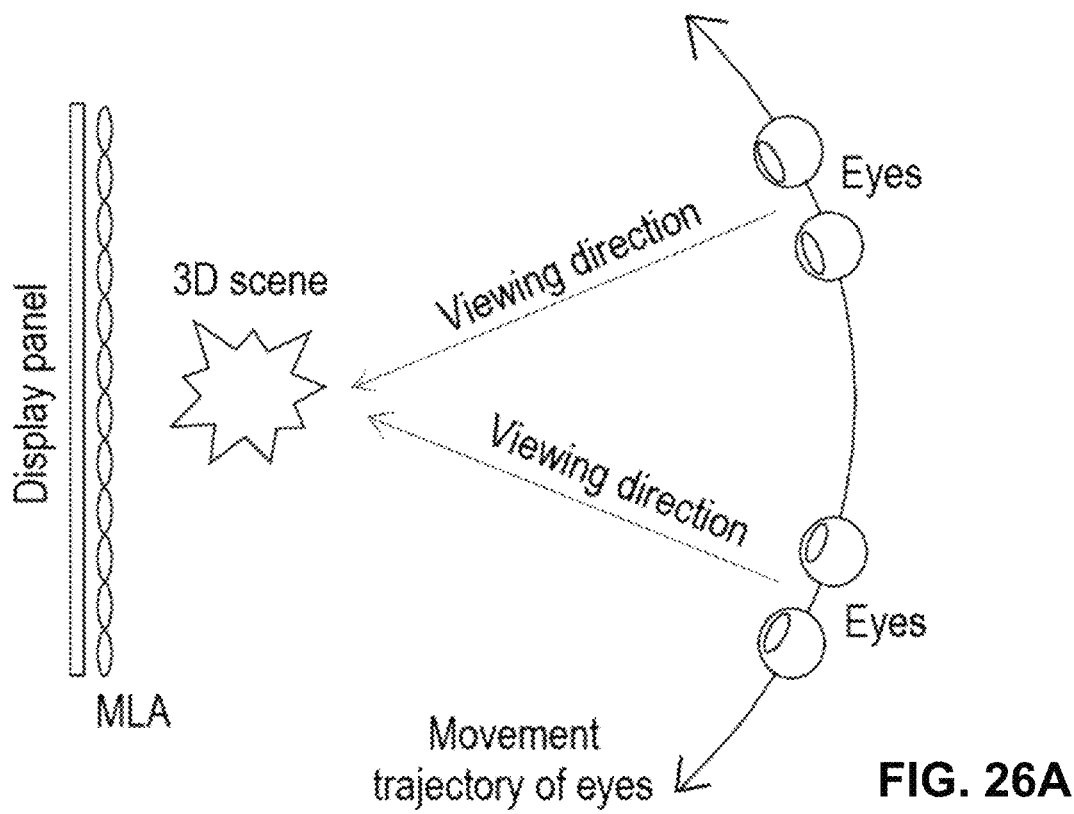
FIGS. 26A and 26B are schematic diagrams showing the movement of the eye(s) and viewing direction with respect to a 3D scene, display panel, and MLA for 3D integral LFD based on far-eye viewing of real images and near-eye viewing of virtual images, respectively.
Figure 26B:
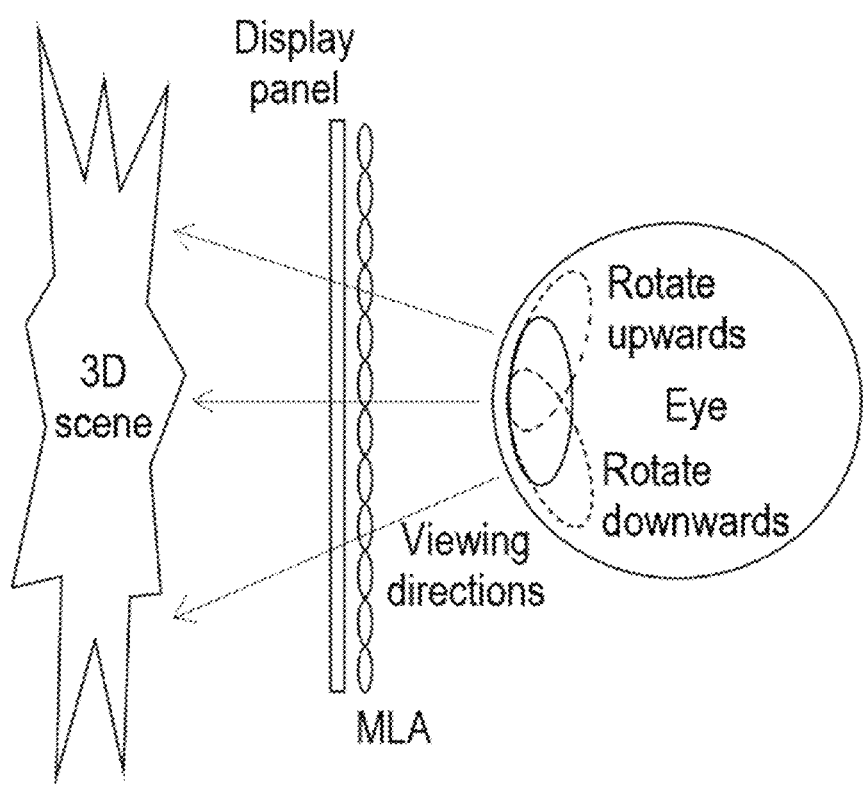

As shown in FIG. 25A, in the case of the far-eye integral-imaging LFD, the different views are observed with the viewer's eyes by pivoting around the 3D scene such that he/she moves with respect to the display and MLA. However, as shown in FIG. 25B, for the near-eye LFD, the viewer's eye does not move translationally with respect to the micro-display and MLA, but rather it pivots around the eyeball's center of rotation to observe the different views. FIGS. 26A and 26B schematically illustrate the movement of the eye(s) and viewing direction with respect to the 3D scene, display panel, and MLA for 3D integral-imaging LFD based on far-eye viewing of real images and near-eye viewing of virtual images, respectively.

In terms of the implementation of the end-to-end design framework 200 to optimize the MLA 104 and the image-generation model of the 3D integral-imaging LFD 150, the difference between the cases of the far-eye and near-eye configurations is in the definition of the input multi-view image ($MVI_{IN}$). All of the other parts of the end-to-end design framework 200 as shown in FIG. 11 are the same.

H. 3D Integral-Imaging LFD With Sub-Pixel Rendering of the Display Panel

Integral-imaging LFDs feature ultra-compact volume and freedom from the VAC. However, they currently suffer from low visual resolution. Considering the mainstream display-panel pixel size (greater than 5 μm) and the small panel-MLA gap for compact volume, the pixel size is the dominant factor affecting the resolution. To break the resolution limit dominated by the pixel size, previous studies employ dynamic beam-steering components to spatially shift images, and combine them with original images through a time-multiplexing method. Although these methods can increase the resolution, the time-multiplexing schema and the dynamic components considerably increase the hardware complexity.

Resolution enhancement with simple hardware implementation is highly desirable for LFDs. For example, one may rearrange the pixels in EIs to improve the quality of the reconstructed images (see FIG. 27A and Reference [24]). This has similarity to the technique disclosed herein. However, instead of using a defined algorithm irrespective of the image to be displayed, the method disclosed herein pre-distorts the EIA (that is, rearranging the pixels in the EIA) based on an end-to-end neural network that has been trained with a dataset of images. However, the resolution limit cannot be broken because the image reconstruction is still performed at the pixel level.

In order to break through the resolution limit, the images may be reconstructed at the sub-pixel level. Since each pixel consists of at least three subpixels (forming a triad pixel), one for each of the primary colors of red, green, and blue, the resolution may be tripled. EI generation at a complete subpixel level demonstrated in a prior work took full advantage of the tripled resolution of the subpixels, which is done by an algorithm that recombines subpixels with relatively small raytracing errors from different EIs (see FIG. 27B and Reference [24]). Based on a highly accurate image formation model, the resolution of a typical system is remarkably enhanced from 8.3 to 20.0 pixels per degree, for a gain of 2.41, and the color breakup introduced by the chromatic subpixels is largely suppressed (see FIG. 27C and Reference [24]).

In some embodiments, the end-to-end design framework 200 may use subpixel arrangement of the display panel 102 while optimizing for both the image-generation model and the MLA 104, which may lead to overcoming the intrinsic resolution limit of LFDs, namely the tradeoff between spatial and angular resolution as determined by the display pixel size. For example, referring to FIG. 11, when converting the input $MVI_{IN}$ 204 into the EIA 208, the pixel-mapping algorithm may generate information about the color subpixels of each triad pixel including the luminance (intensity) value of each subpixel. Moreover, the deconvolution network $f_{DECONV}$ may modify the value of each subpixel that make up the image with be a sufficient number of weighting parameters in $P_{DECONV}$.

I. 3D Integra-Imaging Light-Field (Plenoptic) Camera

Integral imaging is a technique that was originally invented by Lippmann for 3D imaging in 1908 for capturing images. The Lytro camera is the first implementation of a plenoptic camera for the consumer market.

FIG. 28 is a schematic diagram showing a 3D integral-imaging light-field camera 500 according to some embodiments of this disclosure. As can be seen, the physical configuration of the integral-imaging light-field camera 500 is the reverse of that of the integral-imaging LFD 150.

More specifically, the integral-imaging light-field camera 500 comprises a MLA 104 in front of an image sensor 502 having a plurality of light-sensing pixels. Light rays from a real-life 3D object/scene 504 first passes through the MLA 104 and is then captured by the image sensor 502. In this way, views of the object 504 from different directions are captured as a plurality of EIs 506. The captured image data may then be rendered and displayed as an adjustable 2D image that may be focused on a particular area of the scene while other regions are blurred, a 3D model on a 2D display that can be rotated within a 3D viewing software, or even with a 3D light field display for true-to-life viewing.

In some embodiments, the end-to-end design framework 200 may be used for optimizing the 3D integral-imaging light-field camera 500. In particular, the end-to-end design framework 200 may optimize the MLA 104 and the post-processing algorithm on the captured image (EIA).

Figure 29:
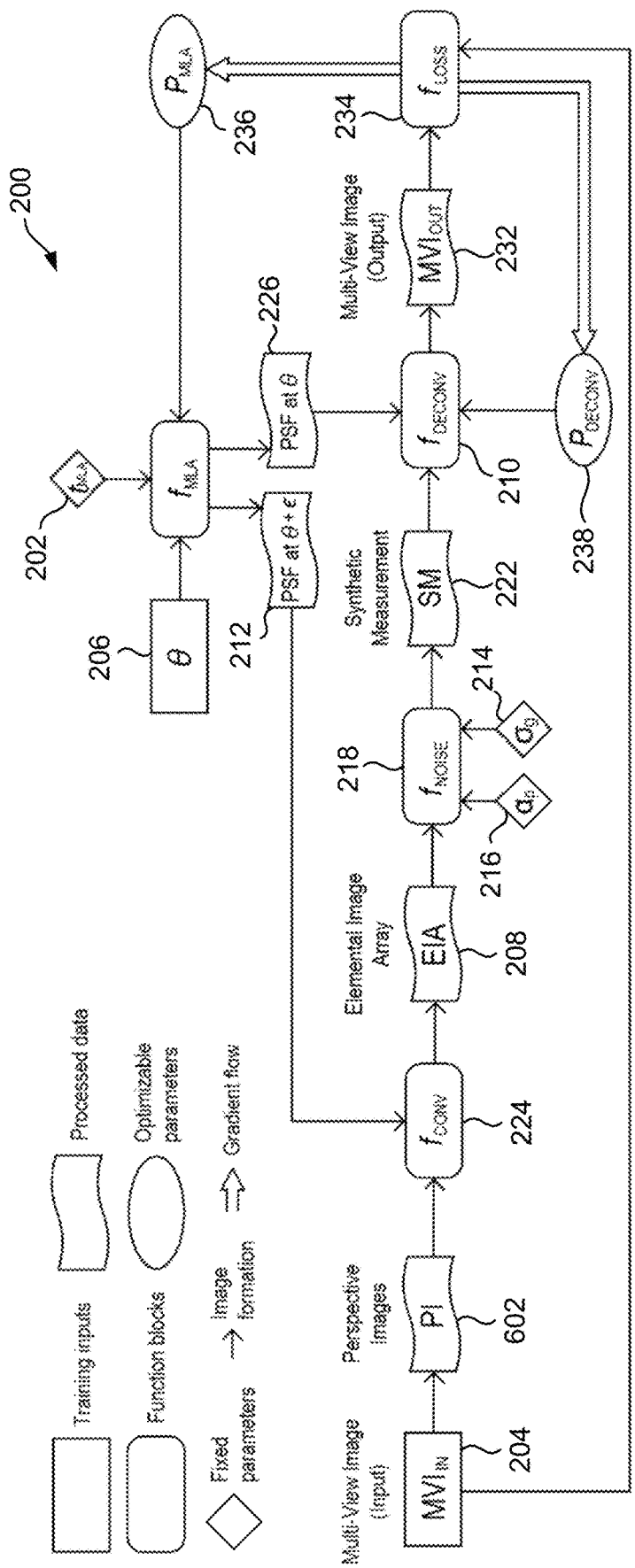
FIG. 29 is a schematic diagram showing an end-to-end design framework for jointly optimizing the MLA and the image post-processing model of the 3D integral-imaging light-field camera shown in FIG. 28 to provide optimal image quality.

FIG. 29 is a schematic diagram showing the architecture of the end-to-end design framework 200 modified from that shown in FIG. 11 for optimizing the 3D integral-imaging light-field camera 500. The symbols used in FIG. 29 are generally the same as those described above, except that in these embodiments,

- the ground truth multi-view images ($MVI_{IN}$) are the multi-view images to be captured by the integral-imaging light-field camera 500 in ideal case, and comprise a plurality of ideal PIs;
- $f_{NOISE}$ represents the image-sensor noise and $f_{DECONV}$ is an image post-processing function block having an image post-processing model for converting the noisy EIA at the image sensor into a multi-view image ($MVI_{OUT}$) that is as close to the ground truth ($MVI_{IN}$) as possible through a plurality of training steps.

For each $MVI_{IN}$, the end-to-end design framework 200 performs the following steps:

(1) using the convolution function $f_{CONV}$ (block 224) to convolve the ideal PIs (block 602) of the $MVI_{IN}$ (block 204) with PSFs at various θ+ε (block 212) to generate the EIA (block 208);

(2) adding display noise with Gaussian and Poisson values of $\sigma_g$ and $\alpha_p$ (blocks 214 and 216, respectively) to the EIA by $f_{NOISE}$ (block 218) to generate SM (block 222);

(3) distorting the SM by using the deconvolution neural network $f_{DECONV}$ (block 210) (which takes in the current weights $P_{DECONV}$ (block 238) and PSFs at various θ (block 226)) to obtain $MVI_{OUT}$ (block 232) which comprise the distorted PIs;

(4) comparing $MVI_{OUT}$ and $MVI_{IN}$ (in other words, comparing the ideal PIs of $MVI_{IN}$ and the distorted PIs generated at block 210) using $f_{LOSS}$ (block 234) to generate the loss. The gradients of the loss are used to adjust the MLA parameters $P_{MLA}$ (block 236) of $f_{MLA}$ and the weights $P_{DECONV}$ (block 238) of $f_{DECONV}$.

In the next epoch, training steps (1) to (4) are executed for another $MVI_{IN}$.

The training steps (1) to (4) are executed for each $MVI_{IN}$ of the training set until the loss is minimized. The optimal $f_{MLA}$ (that is, the model $f_{MLA}$ with optimized parameters $P_{MLA}$ (block 236)) that characterizes the MLA 104 and the optimal $f_{DECONV}$ (that is, the model $f_{DECONV}$ with optimized parameters $P_{DECONV}$ (block 238)) are then jointly obtained, and the training process is terminated.

J. Acronym Key

AR Augmented reality
CMOS Complimentary metal-oxide-semiconductor
DoF Depth of field
EI Elemental image
EIA Elemental image array
FoV Field of view
FoM Figure-of-merit
HMD Head-mounted display
IDMS Information Display Measurements Standard
LFD Light field display
LCD Liquid crystal display
MEMS Microelectromechanical systems
MTF Modulation transfer function
MLA Multi-lens array
MVI Multi-view image
NOA Norland optical adhesive
NA Numerical aperture
OLED Organic light emitting diode
PSNR Peak signal-to-noise ratio
PI Perspective images
PSF Point spread function
PDMS Polydimethylsiloxane
SQUBIC Squared cubic
SM Synthetic measurement
TFT Thin-film transistor
3D Three-dimensional
2D Two-dimensional
UV Ultraviolet
VAC Vergence-accommodation conflict
VR Virtual reality

K. REFERENCES

[1] D. Nam, J. Lee, Y. H. Cho, Y. J. Jeong, H. Hwang and D. S. Park, "Flat Panel Light-Field 3-D Display: Concept, Design, Rendering, and Calibration," in Proceedings of the IEEE, vol. 105, no. 5, pp. 876-891, May 2017, doi: 10.1109/JPROC.2017.2686445.

[2] Byoungho Lee, Soon-gi Park, Keehoon Hong, Jisoo Hong, "Design and Implementation of Autostereoscopic Displays," published by SPIE Press, Bellingham, Washington, USA, 2016, https://doi.org/10.1117/3.2190156.

[3] J. Geng, "Three-dimensional display technologies," Adv. Opt. Photonics. 5, 456 (2013).

[4] Z. Fan et al., "3D Quantitative Evaluation System for Autostereoscopic Display," J. Display Technol. 12, no. 10, 1185 (2016).

[5] Juejun Hu, "LECTURE NOTES: AMORPHOUS MATERIALS," Massachusetts Institute of Technology, https://ocw.mit.edu/courses/3-071-amorphous-materials-fall-2015/resources/mit3_071f15_lecture12/

[6] "GUIDE TO SPHERICAL ABERRATION," https://shotkit.com/spherical-aberration/

[7]"Comparison of Optical Aberrations," https://www.edmundoptics.fr/knowledge-center/ application-notes/optics/comparison-of-optical-aberrations/

[8] C. Kim et al., "Doublet metalens design for high numerical aperture and simultaneous correction of chromatic and monochromatic aberrations," Opt. Express 28, no. 12, 18059 (2020).

[9] U.S. patent application Ser. No. 17/159,807, entitled "3D Light Field Displays Utilizing Micro-LED Pixel Arrays and Metasurface Multi-lens Arrays," to Herman Wong, filed Jan. 27, 2021.

[10] H. Huang et al., "Generalized methods and strategies for modeling and optimizing the optics of 3D head-mounted light field displays," Opt. Express 27, no. 18, 25154 (2019).

[11] H. Huang et al., "Systematic characterization and optimization of 3D light field displays," Opt. Express 25, no. 16, 18508 (2017).

[12] R. Martinez-Cuenca et al., "Progresses in 3D imaging and display by integral imaging," Proc. SPIE 7329, 73290P (2009).

[13] E. Tseng et al., "Neural Nano-Optics for High-quality Thin Lens Imaging," Nat. Commun. 12, 6493 (2021).

[14] Biao Yang, Jinyun Zhou, Qiming Chen, Liang Lei, and Kunhua Wen, "Fabrication of hexagonal compound eye microlens array using DMD-based lithography with dose modulation," Opt. Express 26, 28927-28937 (2018).

[15] FOVI3D Presentation: "Light-field Display Technical Deep Dive," retrieved from http://creativity.arch.tam-u.edu/_common/FoVI3D_DeepDrive.pdf.

[16] S. Banerji et al., "Super-resolution imaging with an achromatic multi-level diffractive microlens array," Opt. Lett. 45, 6158-6161 (2020).

[17] Z.-B. Fan et al., "A broadband achromatic metalens array for integral imaging in the visible," Light Sci. Appl. 8, 67 (2019).

[18] Z. Huang et al., "Achromatic and wide-field metalens in the visible region," Opt. Express 29, no. 9, 13542 (2021).

[19] S. Colburn et al., "Metasurface optics for full-color computational imaging," Science Advances, vol. 4, no. 2, eaar2114 (2018), doi: 10.1126/sciadv.aar2114, https://www-.science.org/doi/abs/10.1126/sciadv.aar2114.

[20] A. Majumdar, "Meta-optical computational imaging systems for large aperture, aberration-free imaging," in OSA Optical Design and Fabrication 2021 (Flat Optics, Freeform, IODC, OFT), F. Capasso, W. Chen, P. Dainese, J. Fan, J. DeGroote Nelson, F. Duerr, J. Rogers, J. Rolland, P. Clark, R. Pfisterer, H. Rehn, S. Thibault, M. Jenkins, D. Wook Kim, and N. Trela-McDonald, eds., OSA Technical Digest (Optica Publishing Group, 2021), paper FW4C.1.

[21] L. Huang et al., "Design and analysis of extended depth of focus metalenses for achromatic computational imaging," Photon. Res. 8, no. 10, 1613 (2020).

[22] M. Martinez-Corral et al., "Fundamentals of 3D imaging and displays: a tutorial on integral imaging, light-field, and plenoptic systems," Advances in Optics and Photonics, vol. 10, issue 3, p. 512, September 2018, doi: 10.1364/AOP.10.000512.

[23] Z. Qin et al., "Image Formation Modeling and Analysis of Near-Eye Light Field Displays," Journal of the Society for Information Display 27(4), March 2019, DOI: 10.1002/jsid.771.

[24] Z. Qin et al., "Resolution-enhanced light field displays by recombining subpixels across elemental images," Optics Letters 44(10):2438, May 2019, doi:10.1364/OL.44.002438.

Although embodiments have been described above with reference to the accompanying drawings, those of skill in the art will appreciate that variations and modifications may be made without departing from the scope thereof as defined by the appended claims.

What is claimed is:

1. An apparatus comprising:
   a pixel array comprising a plurality of pixels for receiving-and-displaying or sensing-and-outputting a plurality of elemental images;
   a multi-lens array (MLA) coupled to the pixel array, the MLA comprising a plurality of lenslets; and
   a circuitry functionally coupled to the pixel array, the circuitry comprising a model for converting a plurality of perspective views to the plurality of elemental images and sending the plurality of elemental images to the pixel array;
   wherein the model comprises a deconvolution neural network; and
   wherein the model and one or more characteristics of the plurality of lenslets are jointly optimized.

2. The apparatus of claim 1, wherein the plurality of lenslets are refractive lenslets, diffractive lenslets, or meta-surface lenslets.

3. The apparatus of claim 1, wherein parameters of the deconvolution neural network and the one or more characteristics of the plurality of lenslets are jointly optimized.

4. The apparatus of claim 1, wherein a plurality of weights of the deconvolution neural network and the one or more characteristics of the plurality of lenslets are jointly optimized.

5. The apparatus of claim 1, wherein the model and one or more characteristics of the plurality of lenslets are jointly optimized by using a deconvolution neural network model.

6. A method for training the deconvolution neural network model of claim 5, the method comprising:
   converting a set of input perspective images to a set of elemental images;
   distorting the set of elemental images by using the deconvolution neural network and point spread functions (PSFs) of the MLA at vicinity $\theta+\epsilon$ of a plurality of viewing angles $\theta$, the deconvolution neural network comprising one or more first parameters, and the PSFs being generated based on one or more second parameters of the MLA;
   adding Gaussian and Poisson display-noise display noise to the set of distorted elemental images to generate synthetic measurement (SM);
   using a convolution function to convolve the SM with PSFs of the MLA at the plurality of viewing angles $\theta$ to generate a plurality of second perspective images;
   comparing the input perspective images and the output perspective images to generate a loss; and
   adjusting the one or more first parameters and the one or more second parameters to minimizing the loss.

7. The method of claim 6, wherein said converting the set of input perspective images to the set of elemental images by using a pixel-mapping algorithm comprises:
   converting the set of input perspective images to the set of elemental images by using a pixel-mapping algorithm.

8. A method for training the deconvolution neural network model of claim 5, the method comprising:
   using a convolution function to convolve a plurality of first perspective images with PSFs of the MLA at vicinity $\theta+\epsilon$ of a plurality of viewing angles $\theta$ to generate a set of elemental images, the PSFs being generated based on one or more first parameters of the MLA;
   adding Gaussian and Poisson display noise to the set of elemental images to generate SM;
   distorting the SM by using a deconvolution neural network and PSFs at the plurality of viewing angles $\theta$ to obtain a plurality of distorted perspective images, the deconvolution neural network comprising one or more second parameters;
   comparing the first perspective images and the second perspective images to generate a loss; and
   adjusting the one or more first parameters and the one or more second parameters to minimizing the loss.

9. A method for evaluating the apparatus of claim 1, the method comprising:
   inputting a plurality of first perspective images to a circuitry of the apparatus for converting the first perspective images to a plurality of elemental images;
   displaying the plurality of elemental images through a MLA of the apparatus;
   capturing a plurality of second perspective images displayed through the MLA of the apparatus along a plurality of viewing angles; and
   comparing the first perspective images and the second perspective images for evaluating the apparatus.

* * * * *